[12] United States Patent
Ekkel et al.

(10) Patent No.: US 11,659,075 B2
(45) Date of Patent: *May 23, 2023

(54) ALERT SYSTEM, DELIVERY SYSTEM AND METHOD AND DOOR BELL SYSTEM

(71) Applicant: ZIPP LABS B.V., Eindhoven (NL)

(72) Inventors: Frederik Ekkel, Eindhoven (NL); Alfred Langerak, Eindhoven (NL)

(73) Assignee: Zipp Labs B. V., Eindhoven (NL)

(*) Notice: Subject to any disclaimer, the term of this patent is extended or adjusted under 35 U.S.C. 154(b) by 191 days.

This patent is subject to a terminal disclaimer.

(21) Appl. No.: 16/998,691

(22) Filed: Aug. 20, 2020

(65) Prior Publication Data

US 2020/0382628 A1 Dec. 3, 2020

Related U.S. Application Data

(63) Continuation of application No. 15/747,376, filed as application No. PCT/NL2016/050548 on Jul. 22, 2016, now Pat. No. 10,757,235.

(30) Foreign Application Priority Data

Jul. 24, 2015 (NL) ...................................... 2015224
Apr. 15, 2016 (NL) ...................................... 2016620

(51) Int. Cl.
*H04M 1/02* (2006.01)
*G08B 1/08* (2006.01)
(Continued)

(52) U.S. Cl.
CPC ............ *H04M 1/0291* (2013.01); *G08B 1/08* (2013.01); *G08B 3/10* (2013.01); *G08B 7/06* (2013.01);
(Continued)

(58) Field of Classification Search
CPC ....... H04M 1/0291; H04M 11/02; G08B 1/08; G08B 3/10; G08B 7/06; G08B 13/22; G08B 19/005; G08B 19/00
See application file for complete search history.

(56) References Cited

U.S. PATENT DOCUMENTS

2015/0049191 A1 2/2015 Scalisi et al.

FOREIGN PATENT DOCUMENTS

WO WO 2011/106787 A2 9/2011

OTHER PUBLICATIONS

International Search Report for PCT/NL2016/050548 dated Oct. 20, 2016.
(Continued)

*Primary Examiner* — Nabil H Syed
*Assistant Examiner* — Cal J Eustaquio
(74) *Attorney, Agent, or Firm* — Adsero IP

(57) ABSTRACT

An alert device includes electronic circuitry and at least a first antenna. The circuitry is designed for sending out a first signal, for wireless communication with at least a first hand held communication device, and at least a second signal for wireless communication with at least a second hand held communication device. The second signal differs from the first signal, preferably in at least one of transmitting energy, transmitting frequency, coding and pulse length. The device includes a switch for switching between: a first mode in which only the first signal is transmitted and a second mode wherein the first and second signal are transmitted; or a first mode wherein only the first signal is transmitted and a second mode wherein only the second signal is transmitted.

18 Claims, 13 Drawing Sheets

Figure 1:
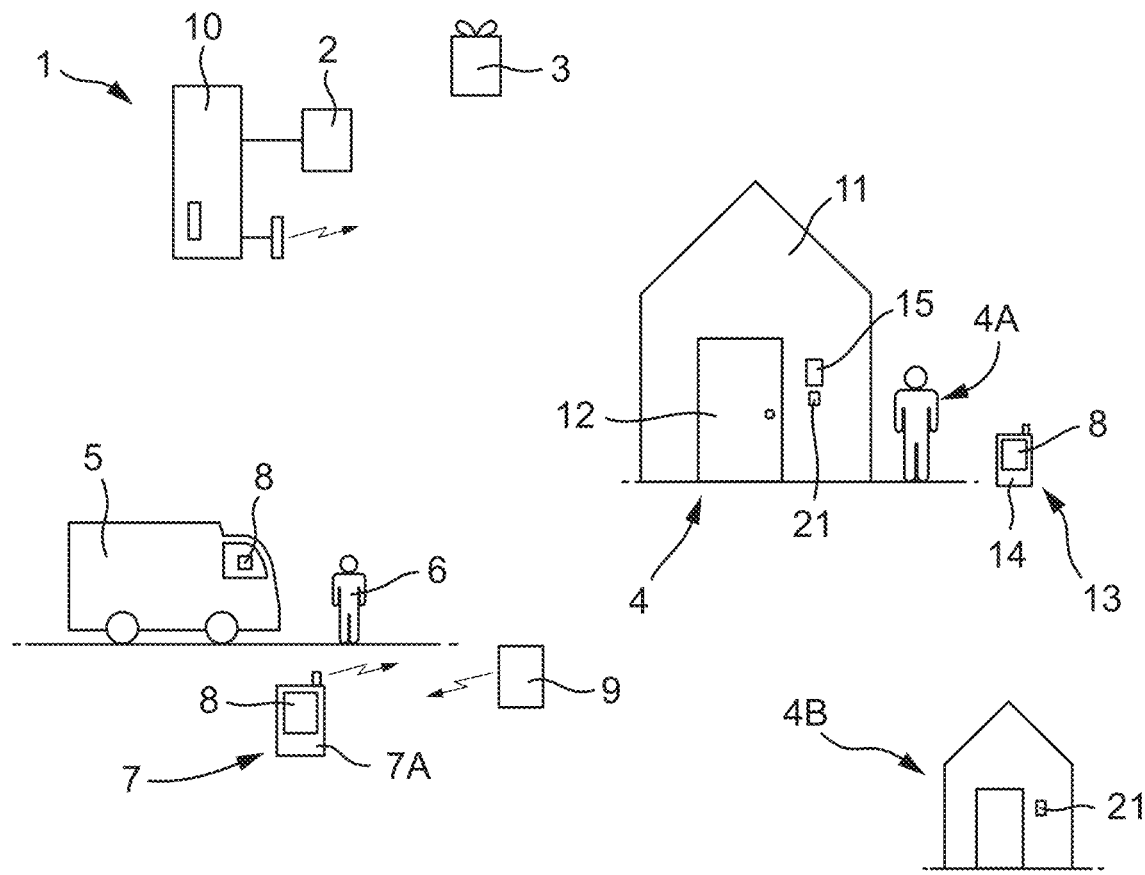

(51) Int. Cl.
      *G08B 3/10*          (2006.01)
      *G08B 7/06*          (2006.01)
      *G08B 13/22*        (2006.01)
      *G08B 19/00*        (2006.01)
      *H04M 11/02*       (2006.01)

(52) U.S. Cl.
      CPC ........... *G08B 13/22* (2013.01); *G08B 19/005* (2013.01); *H04M 11/02* (2013.01); *G08B 19/00* (2013.01)

(56) References Cited

OTHER PUBLICATIONS

Nafie et al, "Enhancements to the Bluetooth Specification", Conference Record of the 35th, ASILOMAR Conference on Signals, Systems, & Computers, Pacific Groove. CA, Nov. 4-7, 2001; [ASILOMAR Conference on Signals, Systems and Computers], New York NY IEEE Nov. 4, 2001 pp. 1591-1595.

Pasanen et al., "New Efficient RF Fingerprint-Based Security Solution for Bluetooth Secure Simple Pairing", System Sciences (HICSS), 2010, 43rd Hawaii International Conference on System Sciences, IEEE, Piscataway, NJ, Jan. 5, 2010, pp. 1-8.

Sheikh et al., "Wireless Networking for Monitoring and Control System of a Steel Plant", Wireless Personal Communications, Kluwer Academic Publishers, DO, vol. 66, No. 4, 2012, pp. 771-788.

Written Opinion of the International Searching Authority for PCT/NL2016/050548 dated Oct. 20, 2016.

Fig. 3
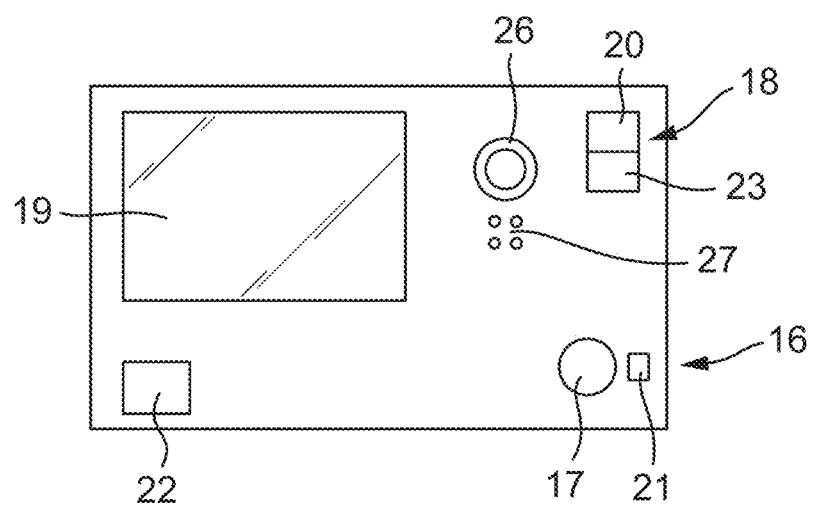
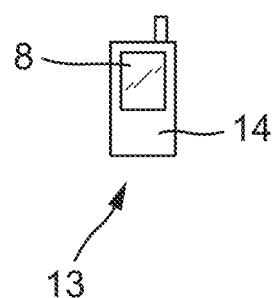

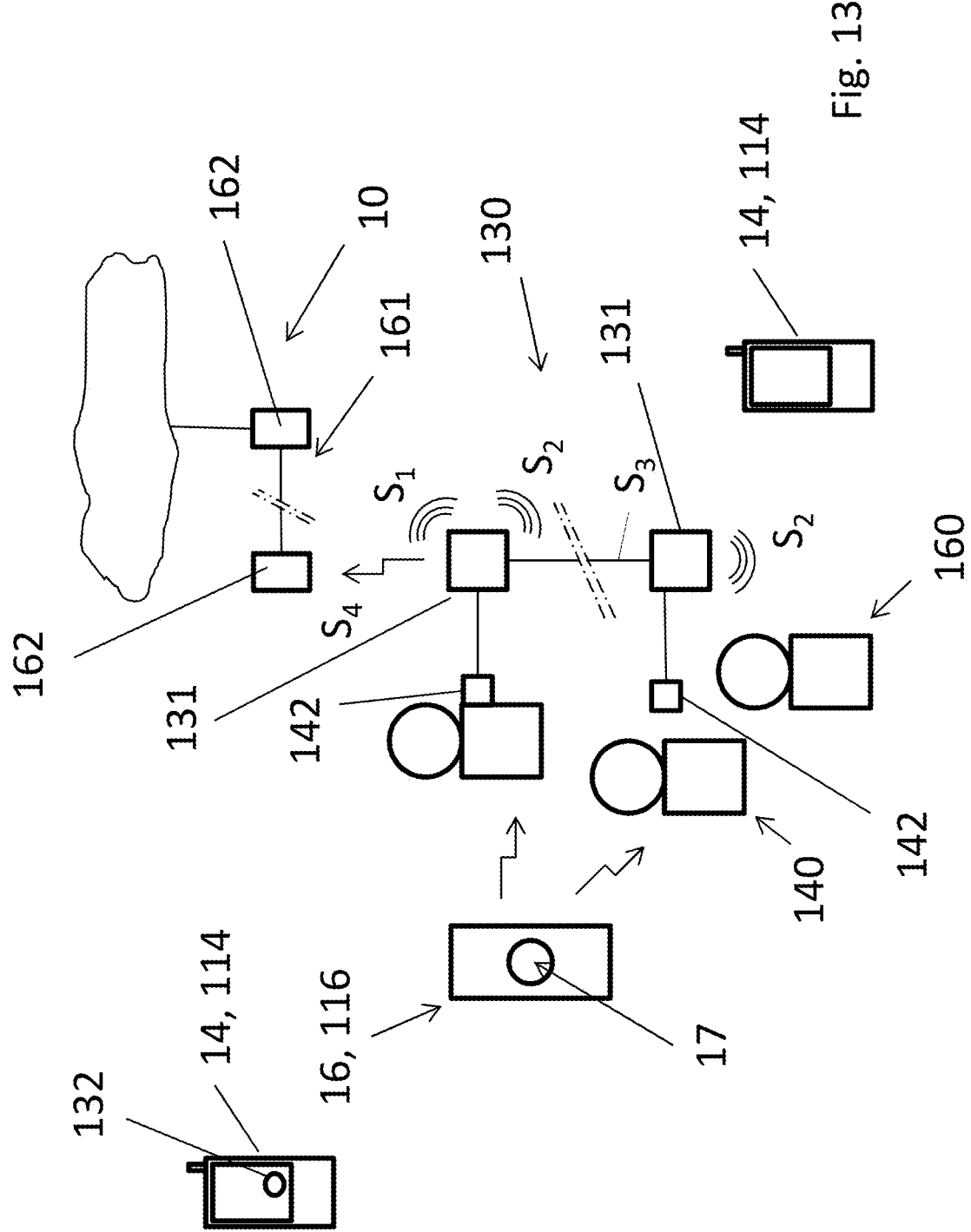

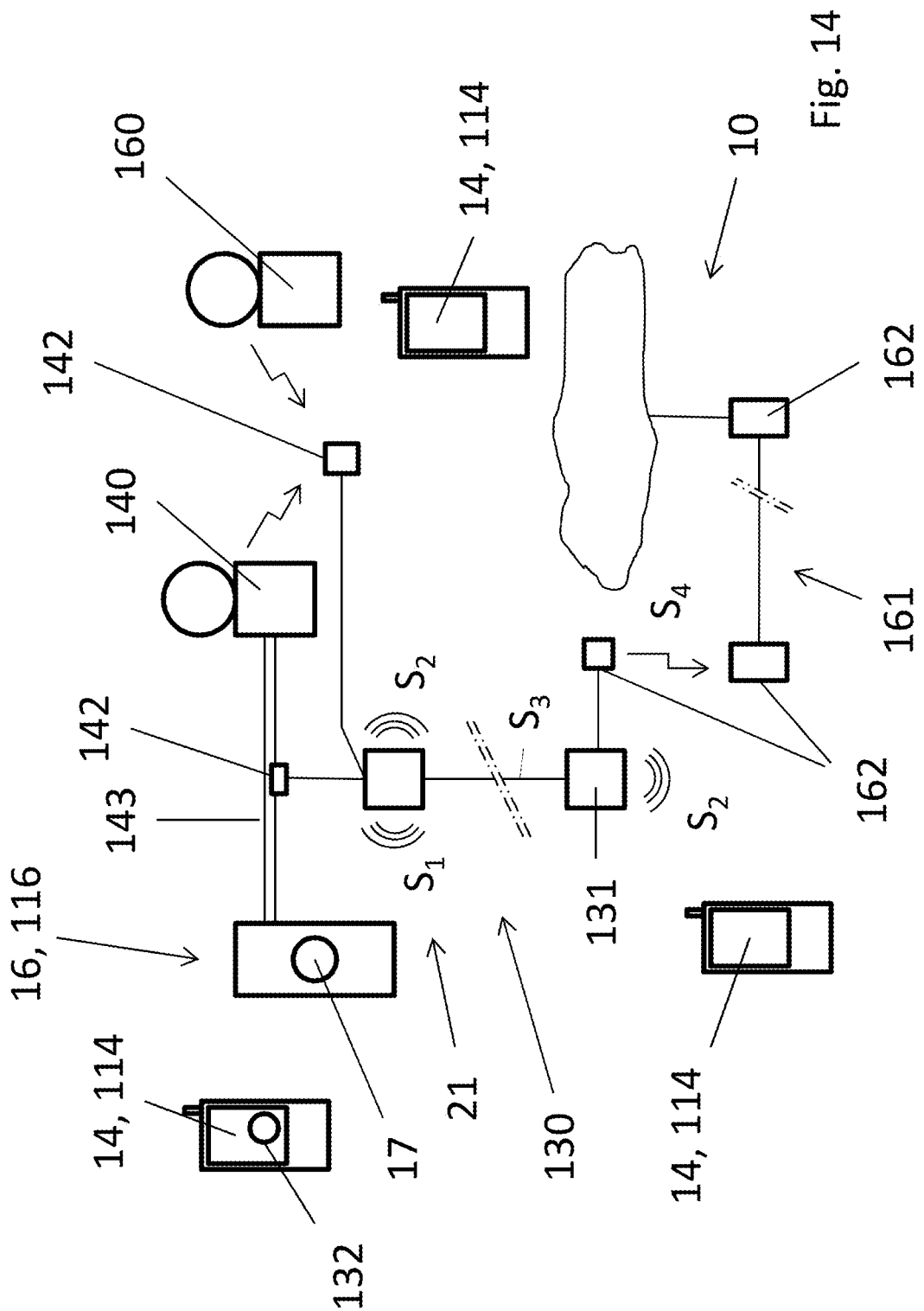

ALERT SYSTEM, DELIVERY SYSTEM AND METHOD AND DOOR BELL SYSTEM

CROSS-REFERENCE TO RELATED APPLICATIONS

This application is a Continuation of copending application Ser. No. 15/747,376, filed on Jan. 24, 2018, which is the National Phase under 35 U.S.C. § 371 of International Application No. PCT/NL2016/050548, filed on Jul. 22, 2016, which claims the benefit under 35 U.S.C. § 119(a) to Patent Application Nos. 2015224 and 2016620, filed in Netherlands on Jul. 24, 2015 and Apr. 15, 2016, respectively, all of which are hereby expressly incorporated by reference into the present application.

The invention relates to an alert system, such as a doorbell system.

Existing wireless alert systems such as wireless doorbell systems are delivered with a receiver, more specifically a door chime, which needs to be installed somewhere in a house, for example in the hall or in the living room. This may lead to the problem that the sound of this receiver is not heard in all rooms/levels of the house, and also not in the garden. This may result in visitors standing in front of the house without being let into the house. Obviously a second or even further receiver can be installed, which may even be a portable one. This is rather expensive. Another problem is that the volume of the receiver is difficult to control. This means that for example when a baby sleeps in the house parents sometimes switch off the complete system in order not to be disturbed. Furthermore these systems do not allow the person activating the system to be recognized before visual contact is established, for example by answering the door.

Moreover WiFi based doorbell systems are known, provided with a video system. A problem of such WiFi video doorbell systems is that it expensive and energy consuming. It may be prone to vandalism, especially since the relatively expensive equipment is largely provided outside a front door. Moreover privacy may be an issue when using such system because of the video system which may permanently monitor the area around the door. A further problem is over crowdedness of the WiFi spectrum, especially the WiFi 2.4 Ghz spectrum and so the performance of the connection over WiFi will not be perfect. This problem is becoming more serious now increasing numbers of devices are operated using WiFi.

Therefore there is a need for an alternative alert device and system and method. There is a need for an alert system and method with which a person can be alerted easily and directly, even when that person is not in a position to answer directly in person, for example by opening a door. An aim of the present disclosure is to provide a system and method for alerting, such as for example a doorbell system or a method for alerting a person of the fact that someone is at the door, at least reducing at least one of the problems of the prior art. Alternatively or additionally the present disclosure aims at providing a device, system and method for alerting, which provides increased flexibility. An aim of the present disclosure is additionally or alternatively to provide a system and method for delivery which reduces the number of times a delivery cannot successfully be made. An aim of the present disclosure is to provide an alert system which can be applied to doorbells in which wired or wireless doorbell and chime systems can be fitted for such system, even retro fitting an installed base of such doorbell and chime systems.

At least one of these or other aims can be obtained at least in part with a device, system and/or method according to this disclosure.

In an aspect an alert system or alert device can comprise a door bell and a chime operable by a doorbell signal from said door bell. The alert system further comprises at least one sensor for sensing the doorbell signal or an alarm from said chime resulting from said doorbell signal. The sensor can be connected to or form part of:

a circuitry for sending out a wireless signal for wireless communication with at least a hand held communication device; and/or a circuitry for sending out a further signal for activating a computer based and/or Internet based communication system.

The at least one sensor is preferably selected from a group of electric sensors, such as electric current sensors, acoustic sensors, movement sensors, inductive sensors, optical sensors and electromagnetic sensors. In embodiments different sensors may be provided, such that different signals and/or movements can be detected by the system or device.

In embodiments the at least one sensor or combination of sensors can be designed for registering the door bell signal or an alarm by the chime resulting from such door bell signal. The sensor or sensors can be designed for further registering at least one further, different event, such as a fire or burglar alarm signal or movement in the vicinity of a relevant sensor. Thus the alert system can also be used as an alarm system for protection of for example a home or office. Such system can give an alarm irrespective of whether a user is at the premises where the doorbell and/or chime is provided.

The first and/or further signals can be WiFi and/or Bluetooth based, or can be based on any other suitable signal.

With a system and/or device according to this disclosure in embodiments a visitor or delivery person can come to a door of a building, such as a home or office or other premise and ring a doorbell, such as for example an analogue or digital doorbell, hard wired to the chime or wirelessly connected to the chime. The doorbell will provide for a doorbell signal initiating the chime to ring. Such ring will provide an alarm to a user or inhabitant of the premises when sufficiently close to the chime to hear the sound thereof. With the present system however it can be possible for the circuitry to recognize that the doorbell has been rung, which will trigger the system to send a wireless signal which can be received by at least one hand held communication device, such as a mobile phone or tablet computer when within the transmission range of the transmitter transmitting the first signal. This can for example be limited to within and/or close to the premise. The said wireless signal can indicate to the user of the hand held mobile communication device that the doorbell has rung. Different users can be informed at the same time or sequentially, through the same or different such wireless signals. Additionally or alternatively the system can, once the doorbell signal has been provided by pressing the doorbell, transmit a further signal, for example for communication with or initiating action from a computer based or internet based computer system, for communicating with a hand held communication device, even when outside the transmission range for the previously discussed wireless signal or signals. The further signal can thus be used to inform a user of said hand held communication device, such as a mobile phone or tablet, that someone is at the door ringing the doorbell.

In embodiments the or each sensor can be added to an existing doorbell system, as an add on or build in to the system. Thus it can for example be retro fitted in existing buildings, without having to change the doorbell and/or chime. Additionally or alternatively at least part of the circuitry or circuitries can be built in to the doorbell and/or chime and or a doorbell operating system.

By sending the wireless signal and/or further signal to a mobile communication device, directly or through a computer base or Internet based communication system, which can for example comprise or be connected to a mobile phone network, wireless network, Internet, VOIP system or any such communication network, the possibility of a two or more way communication can be made available.

In embodiments upon ringing the doorbell or even apart from ringing the doorbell a person such as a visitor or delivery person holding a first hand held device can receive a first wireless signal from the system and/or send a signal to the system using the hand held device, such that the system can recognize the person and/or transmit information to said persons hand held device. Such can for example be used in order to identify the person at the door to the or a user or proprietor of the premises or a representative thereof and/or make two way communication possible between the person visiting the premises and said user or owner or representative thereof, through their mobile hand held devices, either directly, for example through a mobile phone network, or indirectly, for example through the Internet or computer based communication network or system. This can be any kind of communication, one way or both ways, such as speech, imaging, texting, WhatsApp, sms, preprogrammed messages or the like.

In embodiments an existing doorbell with chime or chimes can be used. A housing can be positioned at the premises, for example close to the door, which can be triggered by means of for example vibration, sound, movement, current detection or any other means register that the door bell is rung. The housing will comprise circuitry for sending out one or more signals, which may be wired and/or wireless and may differ in properties, such as for example in frequency, amplitude, energy, pulse length, coding or the like. Such signal or signals may be transmitted to hand held communication devices such as mobile phones, for example as Bluetooth, WiFi, and/or to a computer network, such as for example a Win network in or for the premises, such as a home computer network, or an Internet based network. This allows people and systems to be alerted when the door bell is rung though such network, anywhere where they can receive such signal. The signal or signals may include or be formed by other signals, such as for a telephone network. Examples of such longer range signals could be or could be based on signals suitable for 3G/4G/LTE; Lora, Sigfox or the like.

In an aspect an alert device according to the present disclosure can comprise electronic circuitry and at least a first antenna, wherein the circuitry is designed for sending out a first signal, for wireless communication with at least a first hand held communication device. The alert device can for example be a doorbell or part of a doorbell system. The device and especially the circuitry can further be designed for sending out at least a second signal for wireless communication with at least a second hand held communication device, wherein the second signal differs from the first signal, preferably in at least one of transmitting energy, transmitting frequency, coding and pulse length. The device can comprise a switch for switching between:

a first mode in which only the first signal is transmitted and a second mode wherein the first and second signal are transmitted; or a first mode wherein only the first signal is transmitted and a second mode wherein only the second signal is transmitted.

Switching between the first and second mode can for example also be initiated automatically, for example after a given period of time without response to the first signal, or after a predefined number of ringing a doorbell initiating the first signal to be transmitted.

Additionally or alternatively the first hand held device can be designed for recognizing the first signal when within communication range of said first signal. The hand held device can comprise software and a transmitter for transmitting the second signal. The software, such as but not limited to an app, can be designed for presenting a switch or the like button on the screen of the first hand held device or for assigning a transmitting function to an existing button or have a dedicated switch, which switch is designed for transmitting the second signal via said transmitter as part of a circuitry. The second signal can then be received by the second hand held communication device to be processed, for example as described hereafter.

Additionally or alternatively the first hand held device can comprise software for receiving and recognizing the first signal. Said software can again be but is not limited to an app, for example the app as described here above and/or hereafter. The first signal can comprise or exist of a identifier for a or the second hand held communication device or the holder of said second hand held communication deice, such as for example a mobile phone number or IP address, which identifier is preferably coded. The software can then be designed for recognizing the first signal and the identifier, for example by decoding, and establishing a communication link with the second hand held communication device or at least a device identified by said identifier, Such communication link can be a direct communication link or an indirect communication link, as described hereafter, for example via a computer network. A direct communication link can for example be provided for via a wireless network, such as for example but not limited to GSM, GPRS, UMTS, 3G, 4G or the like. If such communication link cannot be established, or communication via such link is not possible, an alternative action may be initiated through the system, as described hereafter, for example for providing an alternative to said communication link or an alternative address for delivery or visiting.

In embodiments the second signal can be a signal sent to the second hand held device requesting the establishing of a two way communication link between the first and second hand held devices.

In the present invention a switch can for example be or comprise a hardware component or components such as a push button and/or software components, such as for example an electronic switch. A switch can for example comprise a sensor for sensing movement, sound, images or the like.

With a device according to this aspect communication is for example made possible using two different modes and at least two different signals for communicating with at least two hand held communication devices, such as for example mobile phones, smart phones, smart watches or tablet computers. The first signal can for example be transmitted on a permanent or semi permanent bases by the alert device, for example intermittently, at first intervals, such that it can be picked up by a mobile communication device brought within a transmission range of the first signal transmitted by the alert device. Thus the system can be used as or for a proximity system as will be described hereafter. In preferred embodiments the first signal is transmitted at a relatively low energy level, having a relatively short transmission range. Communication between the first hand held communication device and the alert device may be one way communication in the sense that the hand held device picks up the first signal and processes it. The second signal can be transmitted at will by activating the switch, for example physically or electronically, where after the second signal may be transmitted, for example during a relatively short period of time. The second signal may be transmitted intermittently, for example at intervals which are shorter than intervals used in transmitting the first signal. In embodiments the second signal can be transmitted at a higher energy level, that is with a larger transmission and communication range than the first signal. Thus in a first state, in which only the first signal is transmitted, a relatively low energy level is used for the alert device, whereas only when the switch has been activated and only for a relatively short period of time the energy consumption of the alert device will be higher. The second signal can therefore be picked up by second hand held communication device(s) which may be further away from the alert device than the first hand held communication devices have to be brought relative to the alert device for picking up the first signal.

Preferably the first and second signal differ in at least to aspects chosen from transmitting energy, transmitting frequency, coding and pulse length. Especially when a first of these aspects would be transmitting energy, differing in a second aspect too would allow easy differentiation between the two signals, even when a hand held communication device is brought within the communication range of the first signal. In embodiments of a system using an alert device as described hand held communication devices may be used suitable for receiving and recognizing both the first signal and the second signal, for example by being provided with appropriate software and antenna(s). For example when both signals are Bluetooth or Bluetooth compatible signals they can both be picked up by a mobile communication device such as a mobile phone, smart phone, smart watch or tablet computer provided with a Bluetooth system. Thus by transmitting for example a first code with the first signal and a second code with the second signal, different from the first code, the software on a hand held communication device can be set to recognize said code and therefore distinguish between the first and second signal. Similarly the first and second signal can be made distinguishable from each other by changing the transmitting frequency, pulse length of the signal, transmitting interval, or any other suitable means.

Preferably Bluetooth or Bluetooth compatible signals are used for the first and second signals. This evades the problems associated with a Wi-Fi as discussed, as Bluetooth uses a fast acknowledgement and frequency-hopping scheme to make the link robust, communication-wise and robust technology, requires relatively little energy and is relatively inexpensive. Moreover most mobile communication devices such as mobile phones, smart phones and (tablet) computers are provided standard with Bluetooth technology for short range communication. Pairing of such device with an alert device of the present disclosure is easily possible, in a known manner, for example by providing the hand held mobile devices with suitable software, such as but not limited to a dedicated app. In embodiments the first signal can be transmitted using a Bluetooth chip, whereas the second signal can be transmitted using a Bluetooth chip and a range extenders as known in the art.

In an aspect the present disclosure can be defined by an alert system comprising an alert device as discussed, at least one first hand held communication device and at least one second hand held communication device. The first hand held device is provided with software for recognizing the first signal when the first hand held device is within communication range of the first signal. Preferably the second hand held device is provided with software for recognizing the second signal when the second hand held device is within communication range of the second signal. As discussed the first and/or second hand held device can be suitable for recognizing or at least receiving both the first and second signal, wherein the software can be designed for distinguishing between the said signals.

With an alert system of the disclosure by activating the switch a person can alert a holder of a second hand held communication device, for example of his presence near the switch, since the hand held device will pick up and recognize the second signal communicated to it by the alert device. If the system is used for example as a doorbell system, the alert signal can for example indicate that the person is at a door of a house or other premise. Software on the hand held device can be based on recognizing the second signal activate the second device, for example by showing a message on a screen of the device and/or giving an audible and/or visible signal. Thus the alert system can easily be used as a doorbell system. The user of the second hand held device can set his device, for example the volume or brightness to match his desire.

The first and second signal can be transmitted by the same device, for example a same physical device. However, they can also be sent out by two different devices, for example the first signal by a beacon and the second signal by a hand held device, especially a first hand held device which has received and recognized the first signal from the first device. Obviously the first and second devices can both be designed for sending out the second signal, such that a user of the system can chose to activate the first device, the alert device, for sending out said second signal or the first hand held device.

The alert device preferably can be provided with a unique code or set of codes for the first signal and/or the second signal, such that the individual alert device can be recognized by said code or codes. Thus it can be prevented that a signal from another such alert device or another device will initiate an alert or be recognized by the first and/or second hand held communication device as belonging to the said alert device. The hand held devices can for example be paired in a known manner to the alert device.

If a first hand held communication device is for example paired to or otherwise been provided with the code of the first signal of the alert device, as will be described hereafter, it can recognize the first signal as belonging to said alert device. Software on or of the first hand held communication device can then be triggered by said recognized code of the first signal to perform one or more predetermined actions, for example one of but not limited to alerting the holder of the first hand held device of said recognition, providing a communication link to a second hand held device paired to or otherwise associated to said alerting device, communicating to a computer system that said signal has been recognized or performing an action as defined in a delivery system as described hereafter.

If a first hand held device recognizes the code of the first signal it can communicate to the second hand held device, for example directly or indirectly, for example through a computer system, in order to inform the user of the second hand held device that he is in the vicinity of the alert system and thus for example is at the door of the premise of the said holder of the second hand held communication device. This allows easy identification of the holder of the first communication device to the holder of the second hand held communication device. Software on the second hand held device can be designed for providing an alert signal based on an indication signal received from a computer system, wherein the indication signal is based on a recognition signal received from the first hand held device when a first signal of the circuitry has been recognized by said hand held device.

In embodiments the alert device sending out the first signal, such as a beacon, can be designed for sending as or with the first signal an identifier for for example a second hand held communication device or computer address, such as a mobile phone number or IP address, or an address of a communication or social media network. Which identifier may be coded in the first signal in a known manner. The first hand held device then comprises software for recognizing the identifier and acting on it. Preferably the identifier is not made available to the user of the first hand held device in a manner that he can recognize or store it. The software can for example be designed for providing a switch on the screen of the first hand held device or assigning the function of such switch to a button of the first hand held device which enables establishing a direct or indirect communication link with the second hand held communication device or computer identifiable by said identifier when activating said switch. Although such communication link can also be established automatically upon recognizing said identifier.

In embodiments such switch is only presented when in the first hand held device an indication is provided that such switch should be presented when the first signal is recognized, for example because the user of the first hand held device has to deliver a massage or package to the holder of the second hand held communication device or computer or that he or she wishes to contact such user when near the alert device sending out the first signal, for example for a visit.

In embodiments a switch is only presented to the user of a first hand held device, for example a delivery person, when such switch is relevant to said user at a given moment r under specific circumstances. For example when the user of the first hand held device is a delivery person, only switches or such links are presented to him of addresses or addressees for which he has a delivery to make. This has the advantage that if such person is near a series of devices such as beacons sending out recognition signals such as first signals which may be recognized by the first hand held device, only one or a limited number of such switches may be presented to the user. This will enable the user easier choices to make, based on a delivery item held by him. Preferably in a computer system linked to the system information is made available on the bases of which it can be decided which switches or links should at any given moment be presented to the user of the first hand held device. For example based on the delivery route to be driven and items to be delivered by the user of the first hand held device. The delivery route may for example be manually fed into the system or can be automatically be defined, as will be described hereafter.

In embodiments a user can enter into the system that he is expecting a delivery to be made, for example at a certain time or time interval. This can for example be entered into the computer system, through a site at which an item to be delivered is ordered, or the beacon can be designed for allowing entering such info into the system. Then for example on a first hand held device held by a delivery person receiving a recognition signal for which it has been entered that he expects an item to be delivered, the options as described will be shown on his screen, for example a switch for sending a second signal, an available or non-available signal, a virtual doorbell, contact information, an alternative delivery address or delivery time or the like. Whereas if for the address at which said signal is received no information has been entered that a delivery is expected or info has been entered that no such delivery is expected, no info will be shown on said first hand held device, even though the signal is received and recognized.

In embodiments the alert device such as the beacon can be designed for allowing to set the alert signal or first signal to at least two different settings. First setting can be a setting in which the signal will transmit to a first hand held device receiving said signal that a delivery is expected and/or that information as discussed for example in the previous paragraph may be presented on said first hand held device. Second setting can be a setting in which said info will not be shown on said first hand held device.

Said first and/or second settings may be dedicated to specific first hand held devices. For example some first hand held devices will always present said information on the first hand held device, irrespective of the first or second setting whereas other first hand held devices will only present such information when the signal is in the first setting. The latter hand held devices may be provided with dedicated software. In embodiments the alert device or beacon may be provided with a hardware switch to switch between the first and second setting, and/or may be designed to be set electronically, for example by Blue Tooth, WiFi or the like.

When two or more of the above options for a switch or the like for sending out a second signal are presented to a user of a first hand held device, he can chose the appropriate one. If a switch is presented to him on the hand held device, several options can be provided to him, for example but not limited to an option for sending different second signals for different second hand held devices, an option for sending a non-available signal as discussed herein, an option for sending a request signal to the computer system or the like.

The invention further relates to a delivery system for items, such as consumer goods by delivery service, mail or the like, which preferably uses an alert device or alert system as disclosed.

Presently a consumer ordering an item, for example via a web shop through the Internet, will provide an addressee and a delivery address for delivery of the item. The web shop will have the item packaged for transport and then a delivery service will have the item delivered to the address provided by the consumer, which may be his own address or different address. To this end a delivery vehicle, such as a truck, car, bike or pedestrian will bring the item to the delivery address for delivery. If the addressee is present at the delivery address he or she may accept the item, meaning that the delivery is or at least can be completed. However, if the addressee is not present or at least not in a situation to accept the item, the delivery vehicle will have to take the item back into the vehicle for either delivery at later moment in time or to be picked up by the addressee at a designated location, such as a post office or depot. This means that the delivery cannot be completed at the desired moment. Sometimes the delivery is completed by an unasked-for delivery at a nearby neighbor house, this without the consent of the addressee, and hence with a loss of trust in the delivery system.

In The Netherlands presently up to about 40% or more of deliveries too large to be inserted through a letter box or for which have to be signed by an addressee cannot be delivered at the designated time the driver arrives at the designated address and has to be taken back, for later delivery or delivery at a depot for retrieval by the addressee. This is costly and ineffective, results in increased traffic and therefore pollution and means that the addressee will receive the item at a later moment in time, which may be a day or more later.

It has been proposed to deliver items not at an addresses home address or office address, but at a designated place, such as a store or post office, for retrieval by the addressee. This means that the delivery can be made by the delivery service at any time during opening hours of said designated place and that the addressee can retrieve the item delivered at similar hours. However, this system may be useful for relatively small items, but not for larger deliveries.

It has also been proposed to provide a box at the address for delivery, which can be opened by the delivery person for depot of the delivery in said box and by the addressee for retrieval of said delivery therefrom. This however requires relatively much space at the addressees outside area, for positioning of such box, which box has to be well protected against theft and break in. Moreover such system is costly and necessitates both the addressee and the delivery person to have means for accessing said box, such as a code or key. This makes such system impractical because different delivery services may be required to use such system. Furthermore again such system is at best limited to relatively small deliveries and may prevent multiple deliveries.

Therefore there is a need for an alternative delivery system and method. There is a need for a delivery system and method with which deliveries can more often successfully be made, even when an addressee is not in a position to receive the delivery at an initially provided, intended delivery address. An aim of the present disclosure is to provide a system and method for delivery at least reducing at least one of the problems of the prior art. Alternatively or additionally the present disclosure aims at providing a system and method for delivery of items to addressees, which provides increased flexibility to the delivery service provider and to the addressees. An aim of the present disclosure is additionally or alternatively to provide a system and method for delivery which reduces the number of times a delivery cannot successfully be made.

At least one of these or other aims can be obtained at least in part with a system and/or method according to this disclosure.

In a first aspect a delivery system according to this description can comprising a database comprising data relating to at least one delivery to be made and at least one intended delivery address for an addressee for said delivery, and at least one delivery vehicle. Such vehicle can be any suitable vehicle, such as for example but not limited to a car, van, truck, bike, motorbike, moped or a push cart or the like.

The delivery vehicle and/or a delivery person designated to said vehicle is provided with a first communication system. At least one addressee is provided with a second communication system. The delivery system may further comprising a computer system for providing data from the database to the first communication system. Said data can be formed by or can include data about the at least one delivery and said delivery address.

The second communication system is designed for communicating with the first communication system and/or with the delivery person and/or with a computer system associated therewith, for providing an alternative delivery address for the delivery, especially during the delivery of said item and/or the computer system is designed for providing at least one alternative delivery address during delivery, said alternative delivery address provided from the database.

The delivery system can further comprise a proximity detection system designed for detecting proximity of the delivery person and/or delivery vehicle to the delivery address. With such proximity detection system it can easily be established that a delivery person and/or delivery vehicle is close to the delivery address, such that the delivery system can become active for communication between the first and second communication systems and/or between the first communication system and the computer system and/or between the second communication system and the computer system.

In an advantageous embodiment the proximity detection system can comprise an algorithm for presenting a message to the delivery person via the first communication system and/or to the computer system when a proximity signal is provided by the proximity system. In a preferred embodiment the message can include presenting an image on a screen of the first communication system, allowing the delivery person to establish communication with the second communication system. Such image can for example comprise an image representing a link sending a message to the second communication system which will warning for said proximity via the second communication system, for example auditively and/or visually and/or tactually, such as known from warning signals available with a mobile phone. Such image can alternatively or additionally comprise an image representing a link for establishing a two way communication between the first and second communication systems, such that the delivery person and the addressee or another person designated to the second communication system can communicate with the delivery person, for example directly via speech or via email, texting, chat or the like communication means as for example available with smart phones.

In an embodiment the proximity system can comprise a beacon at the delivery address for wireless communication with the first communication system. Such beacon can be based on any radio frequency system, such as for example but not limited to Bluetooth®, Wi-Fi, Z-Wave or Zigbee, audio signals technology or visual technology, such as for example but not limited to using a data signal carried by a light beam, recognizable by using a camera and appropriate software of a smart phone, as developed by Philips, The Netherlands, or the like. In a preferred embodiment the beacon and the first communication system are paired, for example through the computer system, such that the beacon can only communicate with devices of the first communication system paired therewith. This means that in such embodiment only communication devices of the first communication system "known" to the beacon can communicate with the beacon for the proximity system and/or only beacons "known" to the computer system can communicate with communication devices of the first communication system. Such beacon can for example be formed by or comprise or be comprised by an alert device or alert system as described in this disclosure. In the same way a system as described can be used for recognizing other persons than delivery persons.

Alternative to or additional to such beacon the proximity system can comprise one of a GPS type module provided in or for the first communication system for detecting the global position of the delivery vehicle and/or delivery person relative to the delivery address and a visual detection system designed for imaging the environment of a delivery vehicle and/or delivery person and comparing an image taken with an image representative for the delivery address. With both such systems again proximity of a delivery person and/or vehicle to a delivery address can be established, which can have the same or similar effects as discussed herebefore with respect to the beacon.

When using a proximity detection system in addition to or as an alternative to establishing a communication between the first and second communication systems a non-available signal can be sent directly to the first communication system, for example indicating to the delivery person that the addressee is not available, at least not at the intended delivery address, for receiving the delivery and/or providing an alternative delivery address and/or an alternative delivery time.

In a further aspect the computer system can be programmed to provide the at least one alternative delivery address to the first communication system when a non-available signal is provided from the second communication system. A non available signal can be provided for when for example the addressee has indicated in the second communication system that the delivery cannot be made to the intended delivery address or when for example an appropriate response to a door bell signal due to ringing of a door bell at the designated address is absent during a predetermined period of time. The delivery system may allow the second communication system to provide a redirect signal indicating at least one alternative address for delivery to the first communication system. Such redirect signal can for example comprise an alternative delivery address to be sent to the first communication system, i.e. especially to the delivery person or delivery vehicle or may be sent to the computer system of the delivery system, indicative for such alternative delivery address, which can then be sent to the first communication system, i.e. especially to the delivery person or delivery vehicle.

The delivery vehicle can comprise a tracking device, such as a GPS based system, for determining the position of the delivery vehicle relative to the intended address for delivery. An approach signal can then be provided to the addressee and/or the second communication system when the vehicle enters into a predetermined range relative to the intended delivery address. Such approach signal can establish said proximity signal or be part thereof. This will for example allow the addressee to prepare for receipt of the delivery, for example by moving timely to the intended address, or may lead to providing the delivery truck and/or delivery person with at least one alternative delivery address, either directly or via said database, when for example the addressee is in no position to receive the delivery at said intended delivery address when the delivery might be expected at the intended address, for example based on the estimated time of arrival at the intended address given the distance between the intended address and the delivery truck and/or person. In such case a non-availability signal can be issued to the computer system and/or first communication system, as discussed before.

In an aspect a delivery system may comprise a second communication system which can comprise a stationary device, which can comprise a screen. The stationary device can for example be mounted near a door at the intended address of delivery, such that it, and especially a screen thereof is visible from outside the intended address, such that a delivery person can approach the stationary device. This may comprise a door bell. The stationary device can be designed such that an alternative address or several such addresses can be presented to the delivery person at the intended address. Thus when the delivery is not or cannot be accepted at the intended address the delivery person is provided with at least one alternative address for deliver. If several such addresses are presented the delivery person may choose or try several of these addresses.

Similarly the second communication system may comprise a hand held communication device, such as a smart phone, smart watch or tablet, which a person can carry with him/her. Also the first communication system can comprise a hand held communication device. These communication devices can be the first and second hand held communication devices of an alert system as described.

A door bell system suitable for use in such system may comprise at least a door bell, which can be formed by or comprise or be comprised by an alert system as described. Moreover the doorbell system may comprise a door bell control system and an electronic screen. The door bell control system may comprise a memory, an input device and/or a communication unit. The memory may be designed for containing address information. The input device may be designed for receiving at least one address from outside the door bell system. In both cases an interface may be provided for presenting the at least one address on said screen retrieved from said memory and/or provided through said input device. The door bell may be coupled to the door bell control system for activating the interface for presentation of the information on said screen. Alternatively or additionally the door bell system may comprise a communication unit for communicating with a hand held device, such as a smart phone or a laptop, preferably suitable for two way communication. This allows a holder of the hand held device to communicate with a person at or near the door bell, for example for providing an alternative address, and/or for exchanging other information.

In embodiments the delivery system can comprise a hand held communication device and a stationary device comprising a signal unit providing a signal to the hand held device when a signal is provided from the stationary device, for example when a doorbell at an intended delivery address is rung, wherein the delivery system is designed such that:
  at least one alternative delivery address and/or alternative information can be sent from the hand held communication device to the stationary device, to be presented on a screen of the stationary device and/or to the first communication system; and/or
  at least one alternative delivery address is presented on the screen which is derived from the database or has been entered in the second communication device, especially in the stationary device.

In embodiments the delivery system can comprise a stationary device comprising a signal unit and a hand held unit for wireless communication with said stationary device, wherein the delivery system is designed such that at least one alternative delivery address and/or alternative information can be sent to the hand held communication device from the computer system and/or the second communication system, to be presented on a screen of the hand held device.

Thus an addressee can for example actively propose at least one alternative delivery address to a delivery person, or alternatively or additionally can provide the delivery person with other information, in real time and/or can activate the delivery system to present one or more alternative delivery address(es) on said screen and/or the first communication device, derived from the data base or for example from a memory in the stationary device.

In a further aspect a method according to this description can be a method for delivery of at least one item to at least one delivery address of an addressee of the item, wherein an intended delivery address for said item is entered into a first communication system available to a delivery person; and wherein at least one alternative delivery address for the item is provided to the delivery person, prior to or during delivery of said item. This allows the delivery person for example to avoid going to the intended delivery address and directly going to an alternative delivery address as provided to him/her.

During delivery of the item proximity of a delivery person and/or delivery vehicle associated to said delivery person to the intended delivery address can be detected. When said proximity is within a predetermined range a proximity signal can be provided to the first communication means and/or to a second communication means held by the addressee or a person associated to the addressee, such that a communication can be established between the first and second communication means and/or between the first communication means and the computer system, for providing an alternative delivery address and/or an alternative delivery time.

The at least one alternative delivery address and/or delivery time may be provided:
  via a second communication system, provided to the addressee, to the delivery person and/or
  via a computer system, said alternative delivery address provided from a database connected to the computer system, to the first communication system and/or the second communication system.

The second communication device may comprise a screen or the like at the intended delivery address on which the alternative delivery address and/or time may be presented to the delivery person. Alternatively or additionally the said alternative delivery address and/or time may be sent to the first communication device, such as but not limited to a hand held device held by the delivery person. The alternative delivery address or addresses and/or time may be provided in real time or may be retrieved from for example a database of the delivery system or from a memory of the first and/or second communication system. Alternatively the alternative delivery address(es) and/or time may be retrieved from external database or databases, for example a social network database or agenda.

During delivery an approach signal can be communicated to the addressee, especially to the second communication system, when the delivery person enters a predetermined range relative to the primary delivery address, wherein the approach signal triggers the providing of the alternative delivery address or delivery time to the delivery person. This allows the delivery person to amend his/her route based on the alternative delivery address and/or time provided, at a relatively early stage, saving time and driven kilometers, since he/she does not have to go to the intended delivery address at the intended delivery time. Such approach signal can be a proximity signal as discussed before. Preferably the alternative route is calculated automatically and presented to the delivery person.

Additionally or alternatively at the delivery address the at least one alternative delivery address may be presented to the delivery person by a presentation device forming part of the first or second communication system, preferably on a screen, especially after signaling the delivery person's presence at or near the delivery address, for example by ringing a door bell, or a tracking signal of the vehicle or delivery person or the like or said proximity signal.

The at least one alternative delivery address or time can be presented to the delivery person after ringing a door bell connected to a door bell system, wherein:
  the addressee sets a forward signal in the door bell system prior to the delivery, which forward signal initiates the presentation of the at least one predetermined alternative delivery address; and/or
  upon ringing the door bell the addressee receives a signal from the door bell system via the second communication system, where after the at least one alternative delivery address is presented to the delivery person, via said screen and/or via the first communication system.

In this description a door bell has to be understood as at least meaning a system with which a first person can indicate to a second person his or her presence at or near the premises of the second person. This may for example be a hardware door bell provided at or near a door, gate or other entry blocking element to a premise, or a virtual door bell, for example designed for wireless communication with a hand-held or other electronic device held by the second person or a virtual doorbell presented on a hand held device of the delivery person when arriving within a predetermined proximity of the delivery address, for example using a proximity system as discussed. If a proximity signal is received by a first communication system from a series of systems at the same time, they may be presented as a group or series of groups or individually to the delivery person, such that he or she can select an appropriate one. Alternatively they may be coupled to items to be delivered by the delivery person at that given time, such that only the proximity signal or signals or image associated thereto associated with a delivery to be made is or are presented to the delivery person to chose from.

In a system or method according to this disclosure one alternative delivery address and/or time can be provided to a delivery person when the delivery cannot be made at the intended delivery address and/or a the delivery time. Alternatively several such alternative delivery addresses and/or times could be provided simultaneously or subsequently. By providing a multiplicity of such alternative delivery addresses and/or times the delivery person is allowed to make a choice, for example based on his or her route for further deliveries to be made, experience of success at one or more of these alternative addresses, or for picking a second alternative address or time for delivery, should a first such alternative address also not be successful for delivery of the item. Such rescheduling and choice of an alternative address and/or time could also be made automatically based on an algorithm provided in the delivery system.

In general a delivery system may provide an addressee or a person associated with the addressee of a delivery to be made to communicate with a delivery person, directly or indirectly, preferably during the delivering process of the delivery, in order to redirect the delivery person to a different delivery address and/or to a different delivery time.

Figure 1A:
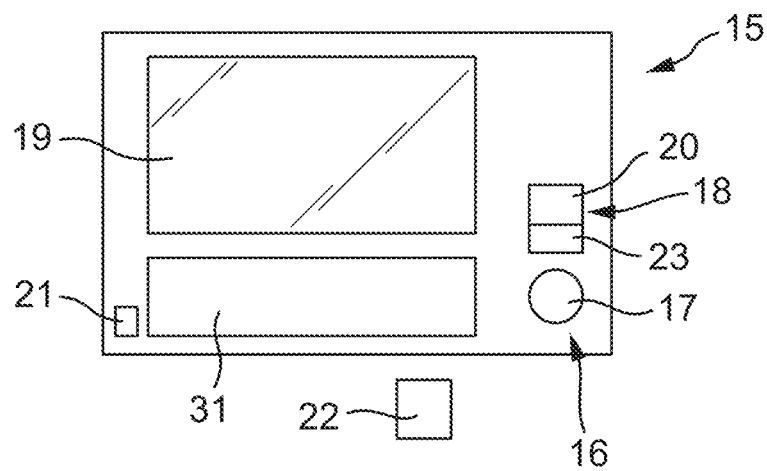
Figure 2:
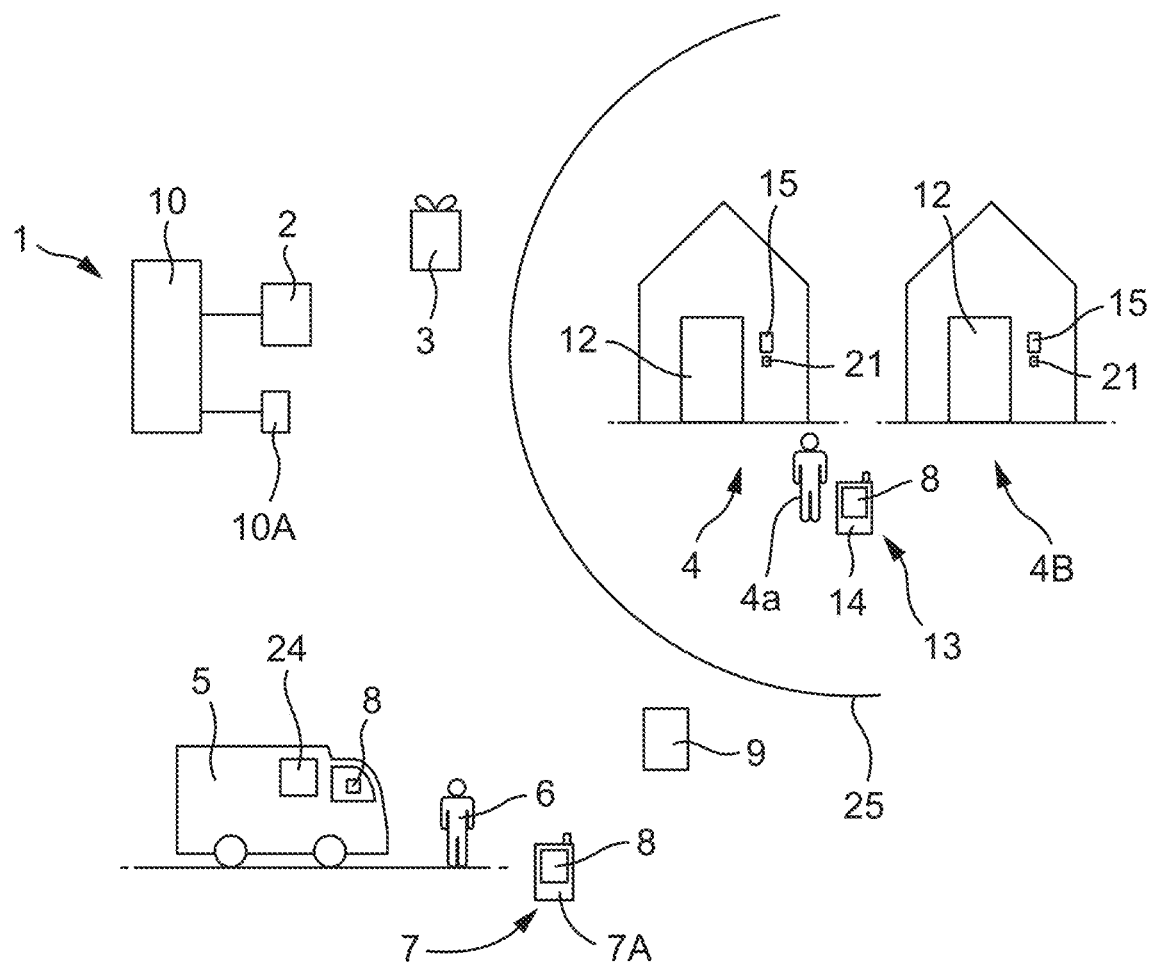
Figure 4:
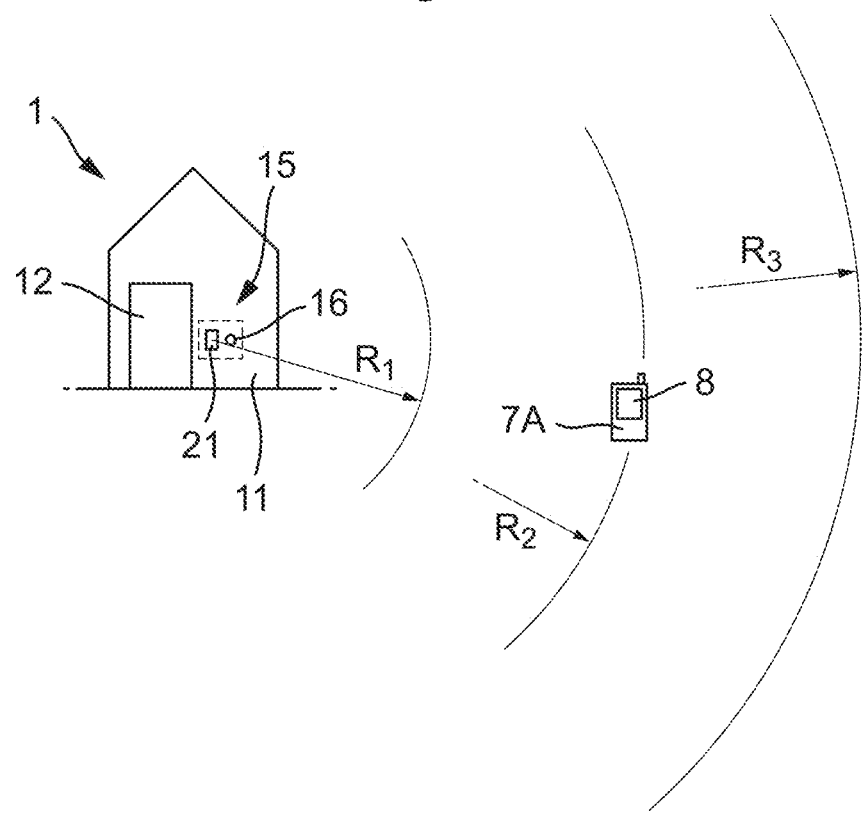
Figure 5:
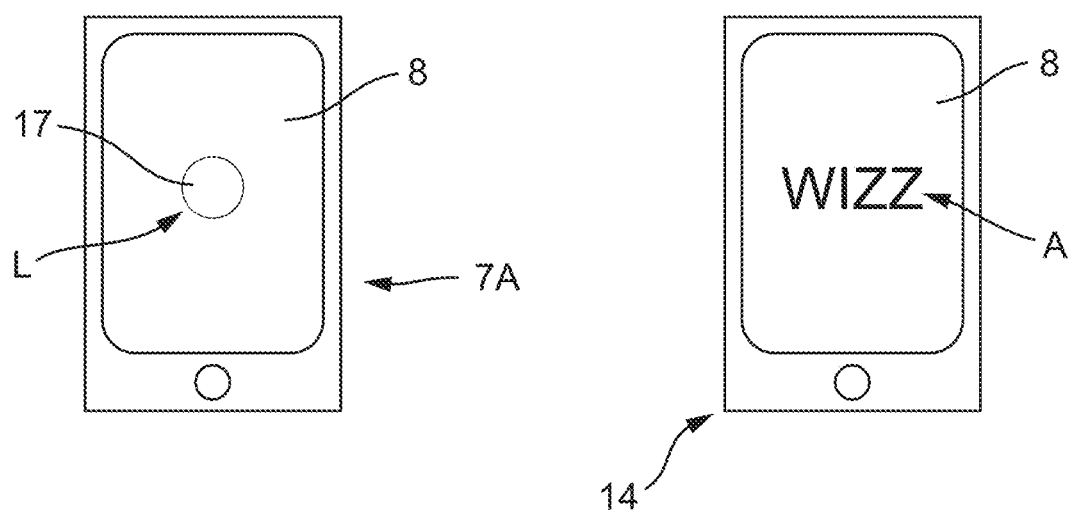
Figure 6:
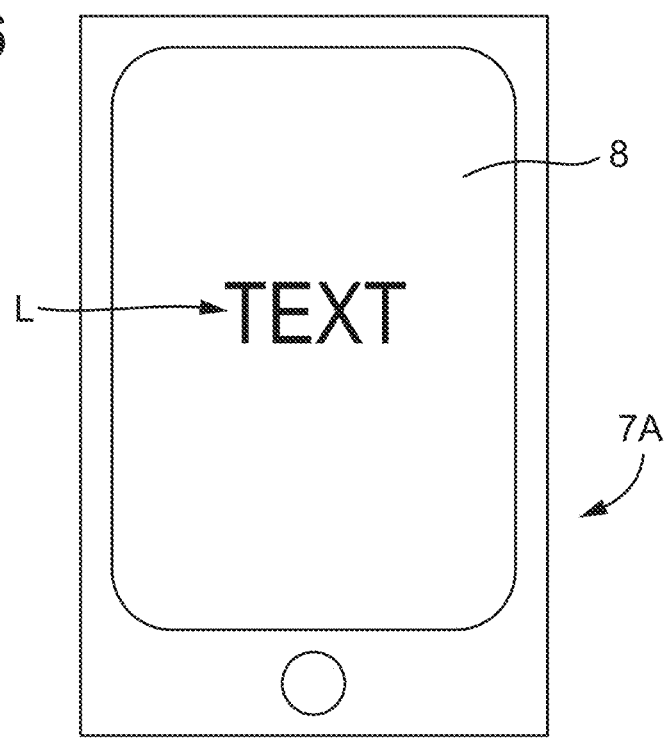
Figure 7:
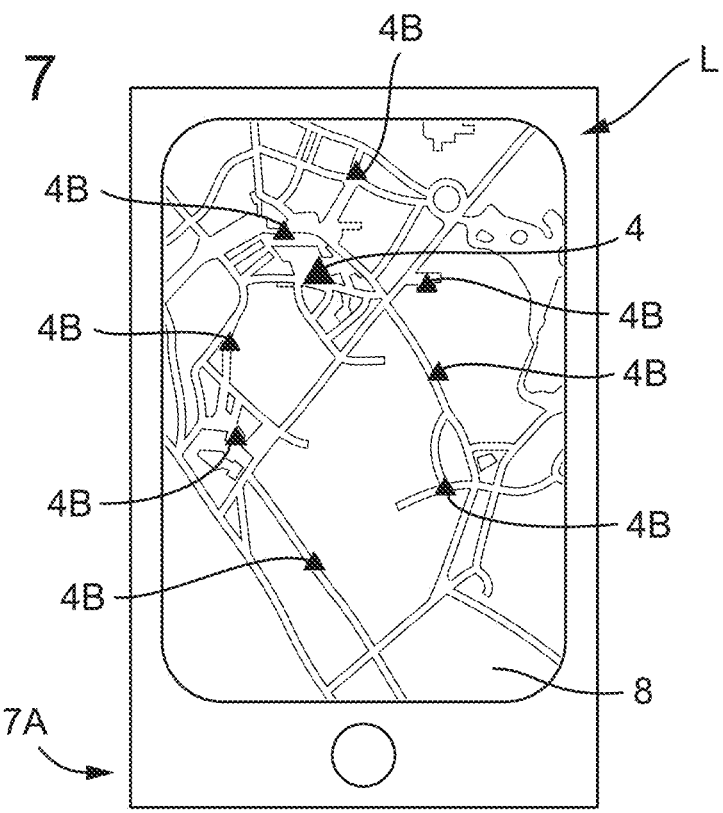
Figure 8:
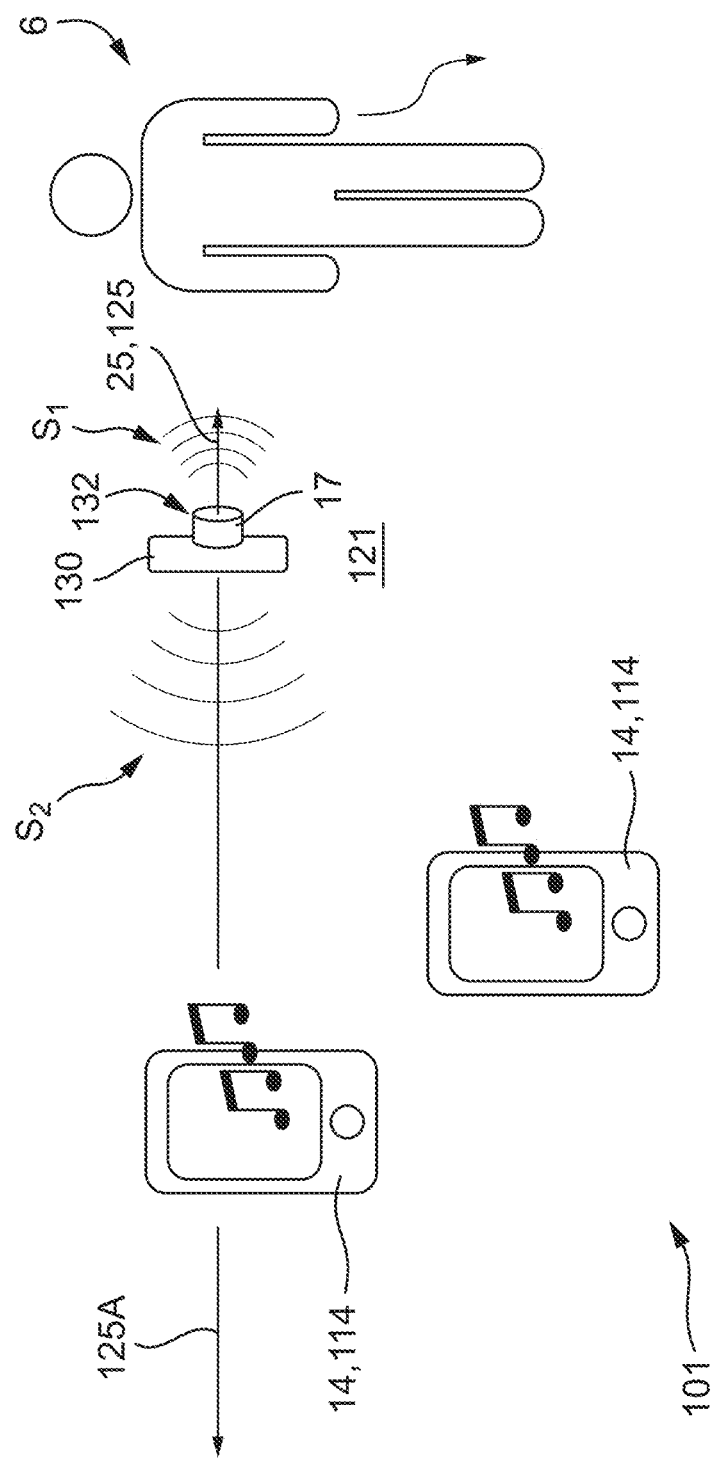
Figure 9:
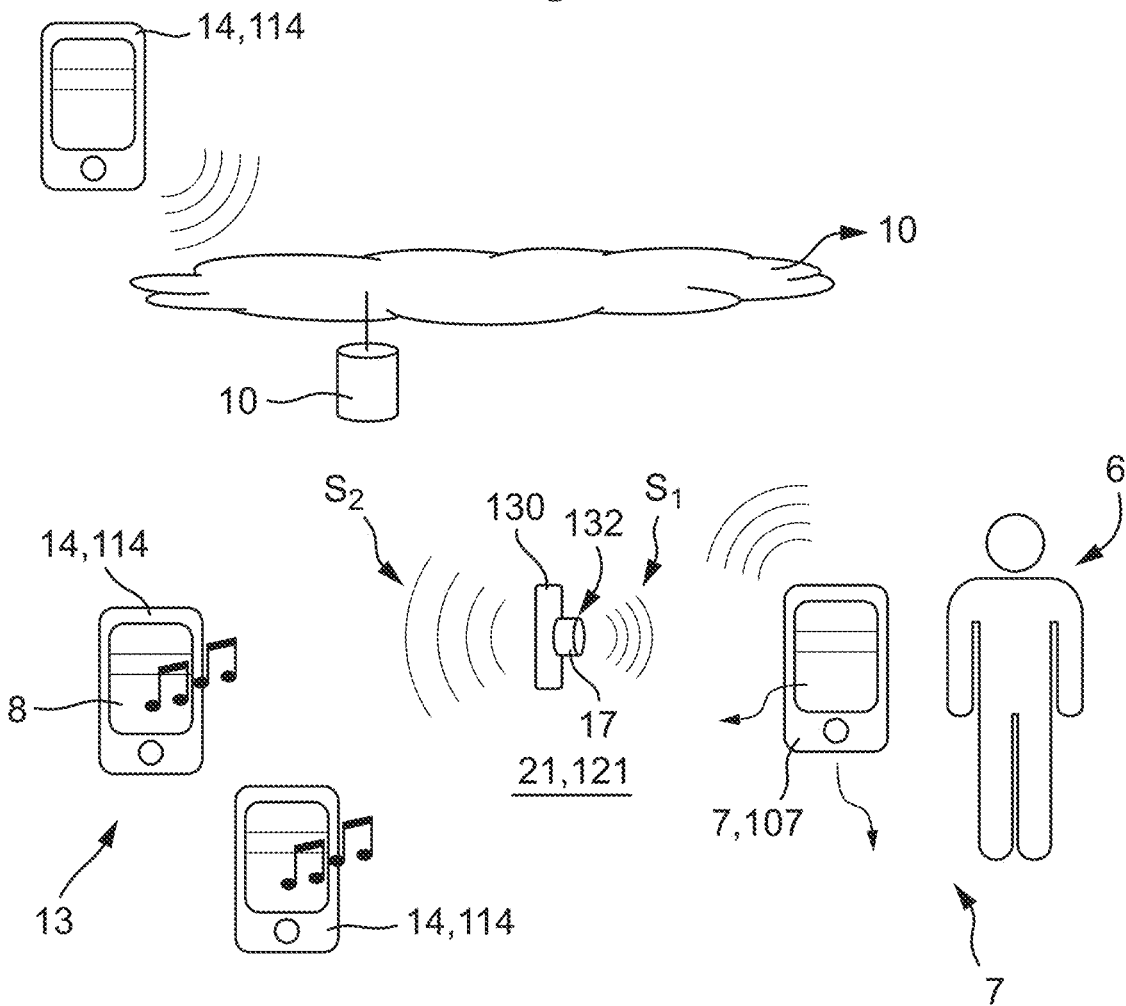
Figure 10:
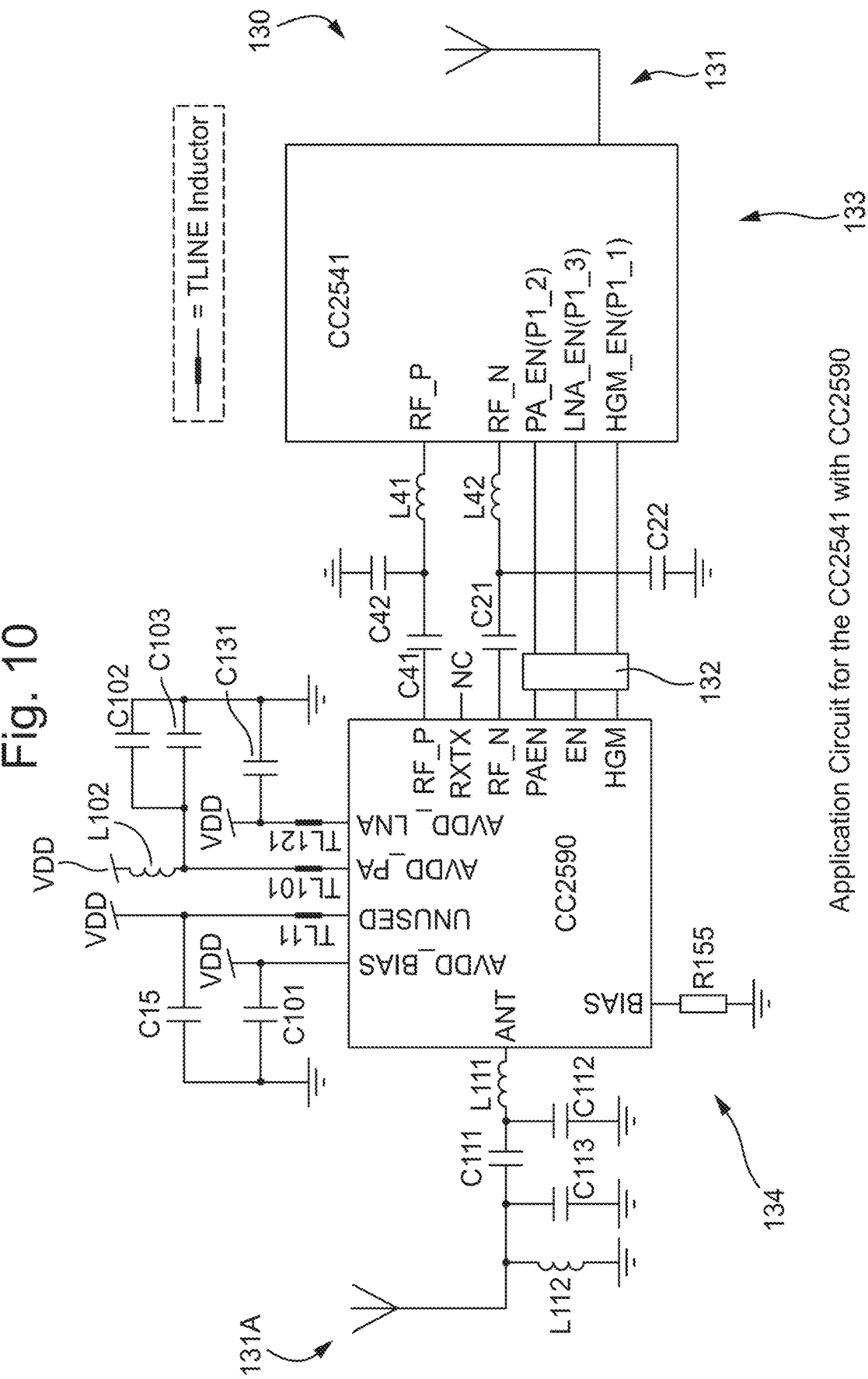
Figure 11:
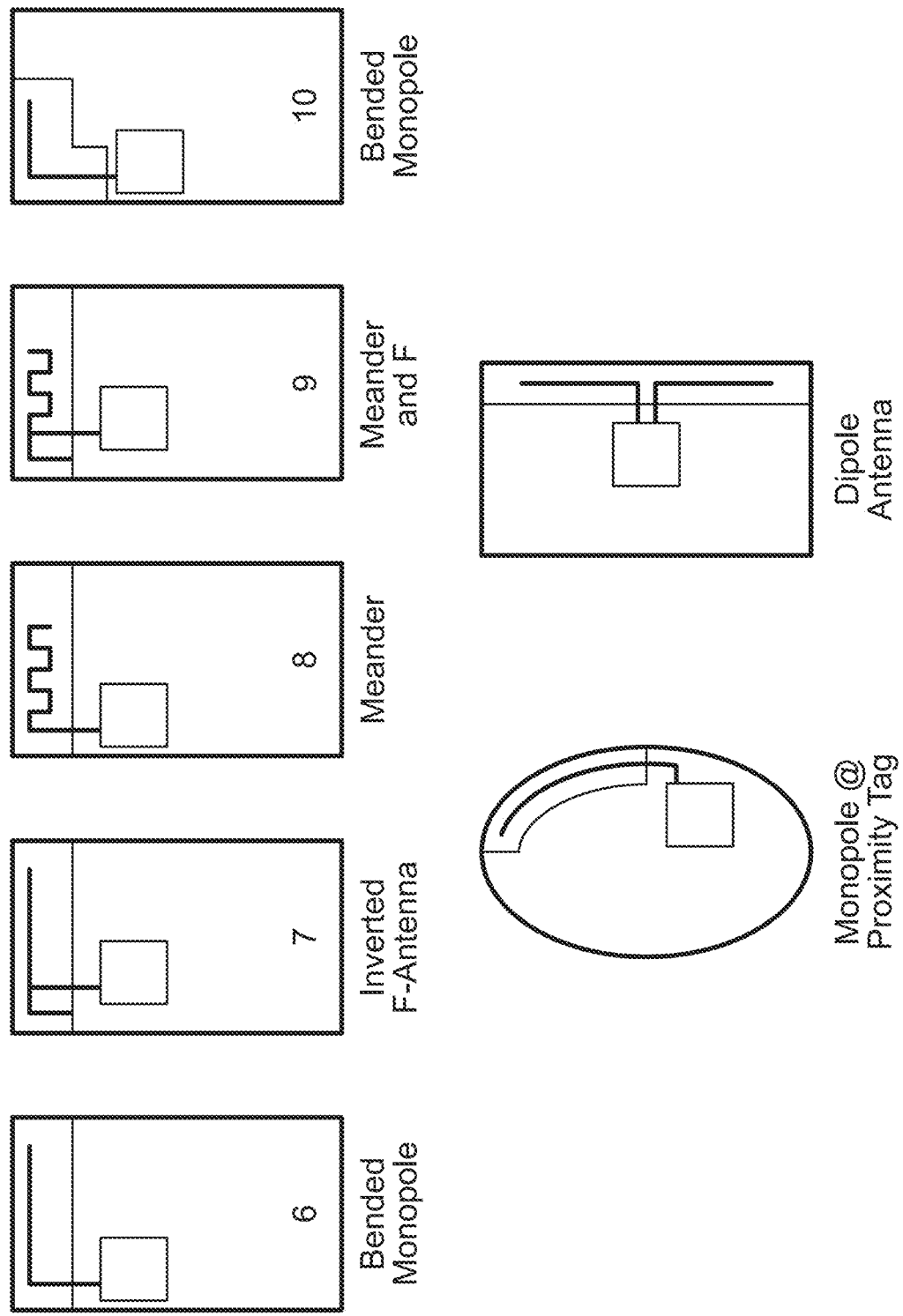
Figure 12:
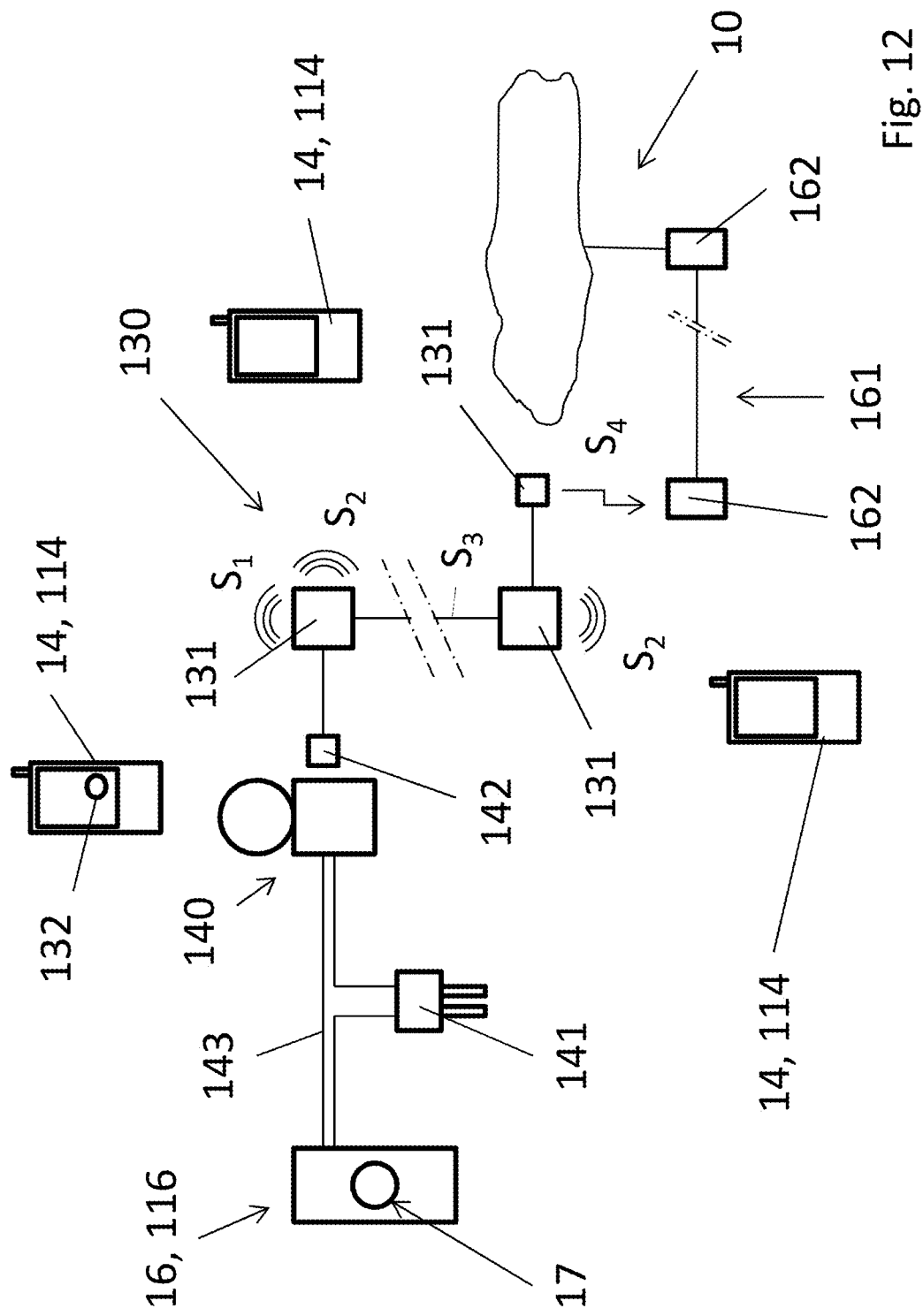

In further elucidation of the present disclosure embodiments of a delivery system, door bell system and delivery method will be described, with reference to the drawings, which are only shown in elucidation and should not be understood as limiting the disclosure in any way. In the drawings:

FIG. 1 schematically shows a delivery system according to the description;

FIG. 1A schematically shows an embodiment of a device for use in a system according to the disclosure;

FIG. 2 schematically shows an alternative embodiment of a delivery system according to the description;

FIG. 3 schematically shows an alternative embodiment of a device for use in a system according to the description;

FIG. 4 schematically shows a further embodiment of a system using a beacon;

FIG. 5 schematically shows a hand held device showing a link to a communication system of a system according to the disclosure, which link by way of example is shown as a virtual door bell;

FIG. 6 schematically shows a hand held device showing an alternative delivery address for an item to be delivered;

FIG. 7 schematically an alternative representation of information on a hand held device for a delivery person;

FIG. 8 schematically shows an alert system comprising an alert device, in this embodiment shown as a door bell system;

FIG. 9 schematically shows an alert system comprising an alert device, in this embodiment in an alternative embodiment of a doorbell system;

FIG. 10 schematically shows circuitry of an alert device;

FIG. 11 schematically shows antenna designs suitable for use in an alert device or alert system;

FIG. 12 schematically shows part of an alarm system, comprising a doorbell and a chime to be activatable by said doorbell;

FIG. 13 schematically shows an alternative part of an alarm system, comprising a doorbell and a chime to be activatable by said doorbell; and FIG. 14 schematically shows a further embodiment of a part of an alarm system, comprising a doorbell and a chime to be activatable by said doorbell.

FIGS. 15 A and B schematically show 2 embodiments of part of an alert system.

In this description different embodiments of systems and parts thereof, as well methods preformed therewith are disclosed and described by way of example only. In these embodiments the same or similar elements have the same or similar reference signs. Combinations of elements of the embodiments shown are also considered to have been disclosed herein.

FIGS. 8 to 11 and 12-14 disclose embodiments of an alert device 121 and an alert system 101 or parts thereof, for example suitable in a delivery system 1 as described. In FIG. 8-14 elements comparable to similar elements as disclosed in FIG. 1-7 have the same or similar reference signs, especially such reference signs increased by 100.

FIG. 12-14 disclose different embodiments of alert systems 1, 101 or alert devices 121, or at least parts thereof suitable for example for use in systems or devices according to the further disclosure, including a doorbell 16, 116 and a chime 140 which can be activated by pushing the button 17 of the doorbell 16, 116. In embodiments such as shown in FIGS. 12 and 14, the doorbell 16, 116 can be wired to the chime 140. By way of example only in FIG. 12 the doorbell 16, 116 and chime 140 are plugged in to a mains outlet for energy, symbolled by the plug 141, whereas in FIGS. 13 and 14 the same energy source can be used or they can be battery operated. In FIGS. 13 and 14 the doorbell 16, 116 is connected to the chime 140 through a wireless connection, as known in the art. This can be an existing door bell system, which can be retro fitted for a system according to the present invention or can be specifically designed as or for such system.

In FIG. 12-14 at least one sensor 142 is provided which is designed to register at least that the doorbell 16, 116 is activated, i.e. the doorbell is rung by for example pushing the button 17 of the doorbell 16, 116 or by pushing a doorbell link or virtual doorbell or switch 132 on a mobile communication device 14, 114 or such device of a first communication system 7, 107, as will be discussed hereafter, for example based on a first signal $S_1$ transmitted by the system 1, 101, 121. The sensor 142 will activate a communication system of the alert system 1, 101, 121. The sensor 142 is connected by wires or wireless to a circuitry 130, for example comprising at least features of a circuitry 130 as will be discussed hereafter. The circuitry 130 is provided with appropriate electronics and at least one antenna 131 for sending out at least one wireless signal. This wireless signal may be a first signal $S_1$ which can be received by a hand held device 14, 114 of a person at the door 12 of a premise 11 at which the system is provided, or is within the transmission range of the first signal $S_1$, as is discussed. Additionally or alternatively the wireless signal can be a second signal $S_2$ which can be received by a hand held device 14, 114 of a person at the premise 11 at which the system is provide, or is within the transmission range of the first signal $S_2$, as is discussed hereafter. If a first and second signal are or can be transmitted by the circuitry 130, the first and second signal $S_1$, $S_2$ are preferably different in at least one characteristic, as discussed hereafter, such as for example in frequency, transmission energy, coding and/or pulse length. The circuitry 130 can for example be provided by or include or be connected to a beacon 21 as discussed hereafter, for transmitting the first and/or second signal $S_1$, $S_2$, as is for example shown in FIG. 14.

The circuitry 130 can also be designed for alternatively or additionally transmit a further signal $S_3$ for activating a computer 10 based and/or Internet based communication system of for example an alarm system and/or delivery system 1, 101, 121. This further signal $S_3$ can be a wired or wireless signal. Embodiments of such systems 1, 101, 121 are by way of example described in more detail hereafter. By such computer and/or Internet based system 10 for example the second signal $S_2$ can be transmitted spaced well apart from the premises, such that a user can be alerted of for example a person at the door 12 or close to the premises 11 at a position different from the premises, as discussed hereafter. Additionally or alternatively the computer and/or Internet based system 10 can be designed to send out a further signal $S_4$, for example to a computer or hand held communication device 14, 114, for example for providing an alert signal, an available or a non-available signal, a registration or log signal to log any calls at the door 12 or premises 11 or any other suitable use.

In embodiments a communication link can for example be provided for via a wireless network, such as for example but not limited to GSM, GPRS, UMTS, 3G, 4G or the like. If such communication link cannot be established, or communication via such link is not possible, an alternative action may be initiated through the system, as described hereafter, for example for providing an alternative to said communication link or an alternative address for delivery or visiting.

The sensor 142 in the embodiments such as for example shown in FIG. 12-14 can for example be an acoustic sensor, registering the sound of the chime 140 when ringing. The sensor 142 can be dedicated to a specific wave length relevant to the sound of the chime 140, for example in order to filter out any other sounds. An additional or alternative sensor 142 can for example be a sensor for sensing vibration of the chime 140 when ringing, a sensor for sensing an electrical current through the wires 143 of or to the chime 140, for example a coil, diode, triode or any other suitable element, or for example a solenoid, or can be an optical sensor, for example for registering movement of the chime 140 or part thereof, or movement at the door bell 16, 116, or for registering transmission of the first signal $S_1$ and/or for registering a signal transmitted by a hand held device 14 114 in response to receiving the first signal $S_1$, indicative of a person at the door 12 or close to the premises 11. Different embodiments of sensors can be combined in a system of the disclosure, for example for building in sufficient redundancy.

FIG. 13 shows an alternative embodiment, in which the doorbell 16, 116 is wirelessly connected to the chime 140. A sensor 142, here shown as a vibration sensor attached to the chime 140 is connected to circuitry 130 for sending out a first signal $S_1$ and/or second signal, $S_2$. A further sensor 142 could be connected to the circuitry, for example for sensing a signal from a further chime 140, for sensing a signal from an alarm such as a fire alarm or burglary alarm 160 or for example for registering movement in the vicinity of the sensor 140, for example for detecting unauthorized entry of a premises 11. In this embodiment the circuitry 130 can be designed again for sending out a further signal $S_3$ to a computer based and/or Internet based system 10, which is here represented as including a cloud based part of the system 10. This system 10 can be designed to communicate with for example a hand held communication device such as a mobile phone 14, as discussed before and hereafter. The first signal $S_1$ is again suitable to communicate with a hand held device 14, 114, the second signal $S_2$ to communicate with the same or a different mobile device 14, 114. In all embodiments a communication link can for example be provided for via a wireless network, such as for example but not limited to GSM, GPRS, UMTS, 3G, 4G or the like, for example through a further signal, such as signal $S_3$ or $S_4$. If such communication link cannot be established, or communication via such link is not possible, an alternative action may be initiated through the system, as described, for example for providing an alternative to said communication link or an alternative address for delivery or visiting.

FIG. 14 shows a further embodiment in which a doorbell 16, 116 is connected to a chime 140 in a known manner. In this embodiment a sensor 142 is connected to wires 143 between the doorbell 16, 116 and the chime 140, for example a solenoid activated by a current in the wires 143 when the doorbell 16, 116 is rung. This could however be any suitable sensor 142, either wired or wireless. The sensor 142 is connected to circuitry 130, which can for example be embodiment in or as or connected to a beacon 21 as will later be discussed. Again the circuitry 130, such as the beacon 21, may be designed to send out a first signal $S_1$ and/or second signal, $S_2$. The circuitry 130 in this embodiment is wirelessly connected, through a further signal $S_3$, to a computer and/or Internet based computer system 10, for communication over longer distances, as discussed here before and hereafter. The communication system 10 can for example be designed to send out a second signal $S_2$ for communication with a hand held device 7, 14, 107, 114 distanced from the premises.

A further sensor 142 could be connected to the circuitry, for example for sensing a signal from a further chime 140, for sensing a signal from an alarm such as a fire alarm or burglary alarm or for example for registering movement in the vicinity of the sensor 140, for example for detecting unauthorized entry of a premises 11. In this embodiment the circuitry 130 can be designed again for sending out a further signal $S_3$ to a computer based and/or Internet based system 10, which is here represented as including a cloud based part of the system 10. This system 10 can be designed to communicate with for example a hand held communication device such as a mobile phone 14, 114, as discussed before and hereafter, such as a first and/or second mobile phone. The first signal $S_1$ is again suitable to communicate with a hand held device 14, 114, the second signal $S_2$ to communicate with the same or a different mobile device 14, 11, such as a second mobile phone 14, 114.

In embodiments where for example a beacon 21 is used, transmitting first and second wireless signals $S_1$, $S_2$, this may be provided in a housing inside the premises 11. It can for example be provided at or near a switch board, fuse box or the like, or near a chime, for example for provision of a mains to plug into. This may however impair transmission of the signals $S_1$, $S_2$ to some extend, limiting the range. In order to circumvent this a beacon 21 could be placed spaced apart from further circuitry, especially spaced apart for the or a sensor for detecting the relevant signal indicating the door bell being rung or the chime being activated. The beacon 21 can for example be placed outside the premises, for example close to or integrated in the doorbell, wired to or wirelessly connected to the further circuitry or at least the said at least one sensor, which may be position internal at the premises. This can for example be advantageous in embodiments in which a visitor, such as a delivery person, can be detected by or can detect a first signal $S_1$ as discussed, as part of initiating the system. This can for example be advantageous when different premises 11 close to each other have a system as described, which could mean that the visitor would receive different first signals $S_1$ from different beacons 21 at different or even the same premises 11 and/or different beacons 21 can recognize the visitor based on for example such first signal $S_1$, a response signal from a hand held device 7, 14 or other recognition means as discussed. By ringing the appropriate door bell 16, 116 at the relevant premises 11 the visitor is visiting, he will then activate only the relevant system 1, 101, 21, 121 at such relevant premises.

In embodiments the circuitry 130 can comprise or be connected to an network 161, for example an on premise network having routers, for example wired or wireless routers 162, and/or an Internet based network 161. A signal $S_3$ and $S_4$ can then be wireless and/or wire based signals. In embodiments the sensor or sensors can be formed as or by or comprise a skimmer.

FIGS. 8 and 9 show part of an alert system 101 comprising an alert device 121 comprising electronic circuitry 130 and at least a first antenna 131, wherein the circuitry 130 is designed for sending out a first signal S1, for wireless communication with at least a first hand held communication device 7, 107. Moreover the alert device 121 can send out at least a second signal $S_2$ for wireless communication with at least a second hand held communication device 14, 114.

The device 121 can comprise a switch 132 for switching between a first mode in which only the first signal $S_1$ is transmitted and a second mode wherein the first S1 and second signal $S_2$ are transmitted. Alternatively the switch can be activated such that in a first mode only the first signal S1 is transmitted and a second mode wherein only the second signal $S_2$ is transmitted. In embodiments instead of or additional to the switch 132 the system 101 or device 121 can comprise a system operated cq activated by a doorbell as for example shown in FIG. 12-14. In such embodiments the activation of the beacon 21 or at least of the electronic circuitry can be achieved by a signal sensed by a sensor 142 instead of or additional to activating the switch or the switch can be embodied at least in part by the sensor 14, such as for example a solenoid based switch.

Figure 15B:
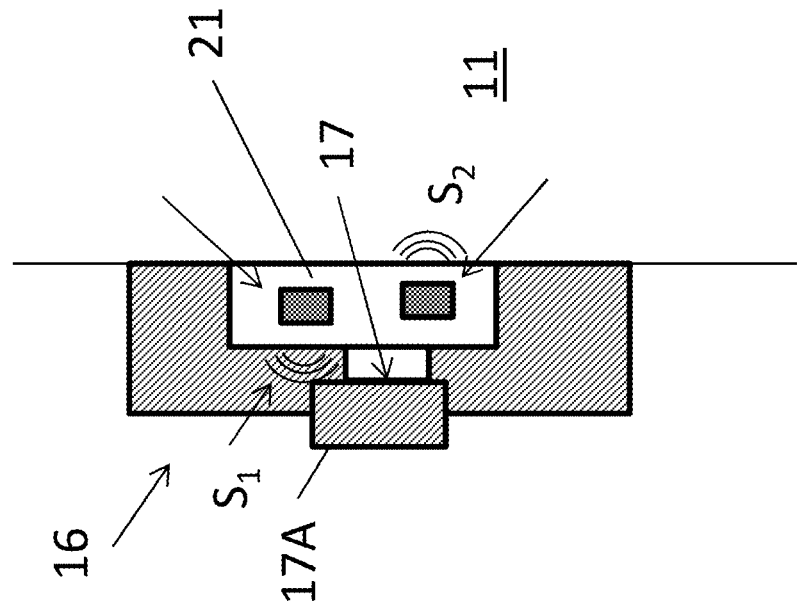
Figure 15A:
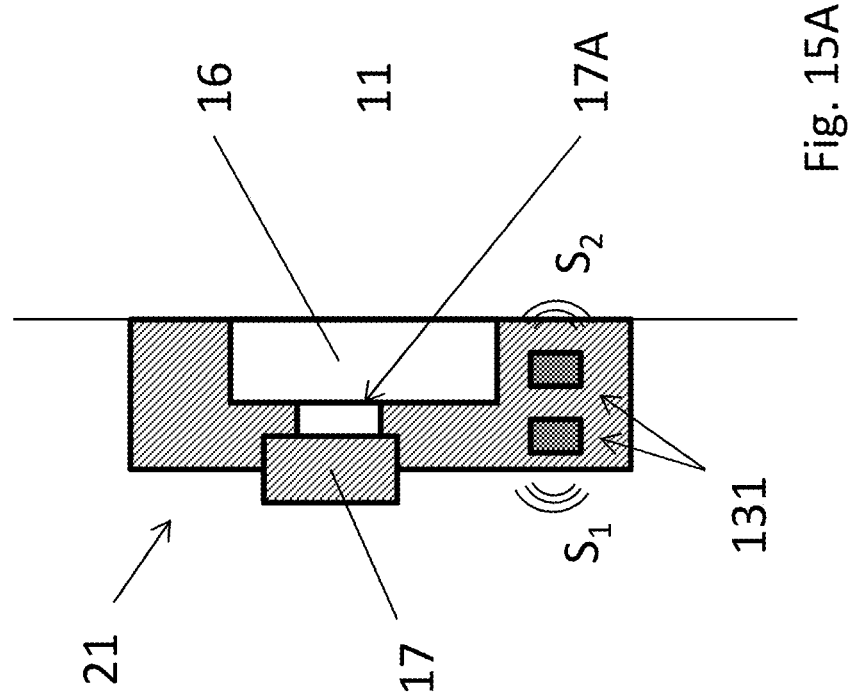

FIGS. 15A and B schematically show two embodiments of part of an alarm system in which a beacon 21 is used, for sending out a first and second signal $S_1$, $S_2$, and having a button or switch 17, such as for example but not limited to that according to FIG. 8 or 9, or as applied in embodiments according to for example FIG. 10-14, In FIG. 15A shows a beacon 21 type device provided over a doorbell 16, 116, such that a button or switch 17 of the beacon 21 can be pressed for activating the beacon 21 to transmit at least one of a first and/or second signal $S_1$, $S_2$, whereas the button or switch 17 of the beacon 21 will also push the button 17A of the door bell 16, 116, for activating the chime 140 of the door bell system that may previously have been installed. This makes it easy to mount the beacon 21 and simultaneously activate the alert system and, more specifically, the combination of alert systems as discussed. In FIG. 15B the order is reversed in the sense that the beacon 21 is positioned within or behind the door bell 16, 116, such that by pushing the button 17A of the door bell 16, 116 also the button or switch 17 of the beacon 21 is pushed, activating the system for transmitting at least one of the first and second signals $S_1$, $S_2$.

Embodiments of FIG. 15A or B can be combined with systems of e.g. FIGS. 12-14 and/or with embodiments of any one of FIGS. 1-11, such that a further signal $S_3$, $S_4$ can be transmitted as well, as discussed herein, after activating the door bell 16, 116 and/or the beacon 21.

The first signal $S_1$ preferably is a relatively short range signal, for example several meters to tens of meters. The second signal preferably has a higher energy level or at least a larger transmission range than the first signal. The first and second signals $S_1$, $S_2$ are such that they can electronically be distinguished or at least individually recognized, for example by appropriate software on the first and second hand held devices 7, 107, 14, 114, as will be described. Each alert device preferably can be recognized by the first and second signals $S_1$, $S_2$, by defining unique first and second signals, especially unique identification codes with the first and second signals $S_1$, $S_2$. Each of the first and second signal $S_1$, $S_2$ can comprise at least the same unique identification code for identifying the alert device 121 from which the signal $S_1$, $S_2$ is received, and a code or code part distinguishing the first signal $S_1$ from the second signal $S_2$.

In FIG. 10 schematically an embodiment of circuitry 130 is shown suitable for an alert device 121, by way of example only. The circuitry 130 comprises in this embodiment a Bluetooth device 133, for example a CC2541 Bluetooth radio chip provided by Texas Instruments (TI), and a range extender device 134, for example a CC2590 Range extender chip provided by Texas Instruments (TI), coupled to said Bluetooth device. A switch 132 is provided in or at least for said circuitry 130, such that the range extender device 134 can be activated or deactivated by operating the switch 132. Obviously the circuitry 130 can be provided for in many different ways, for example fully integrated, performing the same functions. In embodiments the circuitry can be augmented by a further part for sending out a further signal S3 as discussed, in a similar way as for the first and second signal S1, S2, wireless and/or wired.

In an alert device 121 or system 1, 101 the second signal S2 preferably differs from the first signal S1, such that the two signals S1, S2 can easily be distinguished from each other. Preferably the first signal S1 differs from the second signal S2 in at least one of transmitting energy, transmitting frequency, coding and pulse length. The second signal S2 preferably differs from the first signal S1 in at least two of transmitting energy, transmitting frequency, coding and pulse length. More preferably the second signal S2 is at least transmitted at a higher energy level than the first signal S1, such that the second signal S2 has a larger transmission range 125A than the transmission range 125 of the first signal S1. There above preferably a code transmitted with the first signal S1 is different from the or any code transmitted with or by the second signal S2, such that they can easily be recognized as the first and second signals S1, S2 respectively. As indicated preferably at least part of the first and second codes is unique to an individual alert device 121 or system 1, 101, such that the alert device or system can be uniquely recognized by said signals S1, S2.

In embodiments at least part of the code transmitted with the second signal S2 can periodically be changed, in order to avoid that a second communication device 14, 114 may disregard a second signal S2 received for a second time, when the software on said device is set to disregard identical signals from an alert device 21, 121, such as a beacon when received within a set time frame after receiving the signal S2 for the first time.

The circuitry can comprise a first antenna 131 for transmitting the first signal S1 and a second antenna 131A for transmitting the second signal S2. The second antenna 131A can be directional, such that the second signal is mainly transmitted to one main direction, for example mainly inward into a premise at the door of which the alert device 121 or a doorbell 16, 116 equipped with such device 121 is positioned. Alternatively the two antennas 131, 131A can be integrated. A further antenna (not shown) cold be added for sending out a further or third signal S3.

An alert system 1, 101 as disclosed in advantageous embodiments comprises an alert device 21, 121 as described, at least one first hand held communication device 7, 107 and at least one second hand held communication device 14, 114, here shown as mobile or smart phones or tablet computers. The first hand held device 7, 107 is provided with software for recognizing at least the first signal S1 transmitted by the alert device 21, 121 when the first hand held device 7, 107 is within communication range 125 of the first signal S1. The second hand held device 14, 114 can be provided with software for recognizing at least the second signal S2 when transmitted by the alert device 121 when the second hand held device 14, 114 is within communication range 125A of the second signal S2.

This system 1, 101 can be used for example as follows, with reference to FIGS. 8 and 9 or 12-14, as a doorbell system. It should be recognized that obviously it could also be used in other situations in which a first person wishes to actively alert other person(s) of an event.

In FIGS. 8 and 9 an alert device 21, 121, here shown as a doorbell 16, 116, is mounted near a door 12 of a premise 4, such as a house. A person 4A associated to said premise 4, for example an owner, resident or employee has a hand held communication device 14, 114 provided with appropriate software, for example an app for receiving and recognizing at least the second signal S2 as described.

When a person 6, for example a visitor, delivery person, employee or any other person comes to the door 12 he can operate the switch 132, for example by pushing the doorbell 16, which may have a push button 17 in a known manner. This will temporarily set the circuitry 130 to transmit the second signal S2. When the person 4A has his communication device 14, 114 within the communication range 125A of the second signal S2, the software on his device 14, 114 will recognize the second signal S2 and will alert the person 4A of the presence of the person 6 at the door 12. The software preferably is designed such that the person 4A can set the type of alert, for example visual, auditive or and/or recognizable by other senses, for example by vibration, similar to possible settings for mobile phones alerting for an incoming call or message. The person 4A can then decide to take appropriate action responding to said alert.

In embodiments of FIG. 12-14 alternative to or additional to recognition automatically of a person near the door the system can be triggered by pushing the doorbell 16, 116 near the door, resulting in a door bell signal picked up by a suitable sensor 142. Thus even persons not having an appropriate first and held communication device 7, 14, 107, 114 can use the system.

A system 1, 101 can further comprise a computer system 10, which can be designed for providing a communication link between the first hand held device 7, 107 and the second hand held device 14, 114 when the first signal S1 has been recognized by the first hand held device 7, 107 or when the system has been activated by for example pushing the doorbell 16, 116 or the button 17, 132 of a beacon 21 as will be discussed. Such computer system 10 can be formed by, part of or be integrated with a computer system 10 of a delivery system 1 as described. The software on the second hand held device 14, 114 can be designed for providing an alert signal based on an indication signal received from the computer system 10. The indication signal can be based on a recognition signal received by the computer system 10 from the first hand held device 7, 107 when a first signal S1 of the circuitry 130 has been recognized by said hand held device 7, 107. This allows the system 1, 101 to identify the person 6 operating the switch 132 or ringing the doorbell 16, 116, by his or her mobile device 7, 107. The software on said mobile device 14, 114 can for example be set to give different types of alerts for different persons 6, for example distinguishing between persons known to the system, e.g. paired to said alert device 21, 121, and persons not known to the system 1, 101. For example different persons 6 can be made recognizable by assigning different ring tones to them.

The communication link between the first and second hand held communication device 7, 107, 14, 114 can be any suitable type of communication link, for example using WiFi, Bluetooth, GSM, G3, G4 or the like and can be any suitable way of communication, for example but not limited to data communication link, voice link, sms, Whatsapp, Skype, FaceTime and the like. Thus this embodiments will allow the person 4A not only to be alerted that someone has operated the switch 132 but also to allow said person 4A to recognize said person 6 and to directly or indirectly communicate with said person 6.

In a system 1, 101 as disclosed in e.g. FIG. 9 when the person 4A has his mobile device 14, 114 not within the communication range 125A for the second signal S2, the computer system 10 may be set to alert the person 4A by sending an alert signal directly to his mobile device 14, 114 using another communication network, such as for example but not limited to WiFi, GSM, G3, G4 or the like, and/or via the Internet. Then again a direct or indirect communication link can be established between the first and second devices 7, 107, 14, 114 as described. The computer system 10 can be set to recognize when a relevant second device 14, 114 is not within the transmission range of the second signal S2 or is otherwise not available for receiving the second signal S2 or does not respond to said signal S2 within a predetermined period of time, after which the computer system may inform the first hand held device 7, 107 of such fact and/or relay the signal to another mobile device 14', 114' as previously indicated by the owner 4A, or provide another information signal to the person 6 operating the switch, for example but not limited to by providing an alternative address for the person 6 to go to, another time frame to return to the address or proposing another means of communication.

In a system 1, 101 obviously more than one first hand held communication device 7, 107 can comprise software for recognizing a first signal S1 from an alert device 21, 121 or system 1, 101. Similarly more than one second hand held communication device 14, 114 can comprise software for recognizing a second signal S2 from an alert device 21, 121 or system 1, 101. Furthermore first and/or second mobile devices 7, 107, 14, 114 can comprise software for recognizing both first and second signals S1, S2. This allows for example for the system to register whether a second hand held device 14, 114 is within a communication range of the first signal S1 and, if so, use the first signal S1 for alerting the person 4A in stead of or next to the second signal S2.

If more than one second hand held device 14, 14A is associated with the alert device 21, 121 or system 1, 101, for example held by different persons 4A occupying the premises 10, the software on these devices 14, 114 may be designed to allow internal communication between some or all of these devices 14, 114. This can for example allow the holders 4A of these devices to inform each other about an alert, for example indicating that one of them will respond to the alert, such as by answering the door 12. The system 1, 101 may be provided with a logging and data storage facility, allowing to log when the switch 132 is operated and by whom, presence or absence of a user of a second mobile device 14, 114 associated to said system 1, 101 and the like information.

Bluetooth Low Energy (BLE or Bluetooth 4.0) is especially suitable for this system, since it is standard build-in into smart phones. Other wireless technologies like Zigbee, Z-wave and other frequencies like 868 Mhz, 915 Mhz or 433 Mhz may however also be used, or other data signal transferring systems, for example auditive and/or visual as previously discussed. More general, the first and second signals S1, S2 can be any suitable type of signal, such as for example but not limited to based on Bluetooth®, Wi-Fi, Z-Wave or Zigbee, audio signals technology or visual technology, such as for example but not limited to using a data signal carried by a light beam, recognizable by using a camera and appropriate software of a smart phone, as developed by Philips, The Netherlands, or the like.

When used as a wireless digital doorbell system a system 1, 101 according to this disclosure can thus have two alert systems:
  a button on the doorbell
  a proximity beacon signal to detect visitors approaching the door As will be discussed, a button 132 can be a "hardware" button, as for example shown in the drawings, for example a button 17 of a doorbell 16, 116. Alternatively the button 132 can be a "virtual" or software based button or switch. For example a "button" shown on a touch screen of a hand held device or a physical button of the first hand held device which may be assigned to the specific task of button 132 by software and the recognition signal from the beacon.

Pressing the button 132 causes a Bluetooth wireless high power signal to be send to paired smart phone mobile devices 14, 114 in the vicinity (for example inside the house 12 or in the surrounding gardens). The smart phones 14, 114 will show a message and an audible bell sound (chime) is heard. When multiple people with phones 14, 114 are in the house 12, all may get this message and in the bell companion App it may for example be possible to select a button "I will get it!". This causes a push message to all other smart phones 14, 114 in the house 12 to announce that somebody will answer the door 12 in order to avoid that more people are getting to the front-door. Also a signal could be sent to the smart phone 7, 107 of the person 6 at the door 12 that someone is coming.

Part of an alert device and system design may be a range boosting hardware design in order to maximize the transmission range of the second Bluetooth signal S2. It may need to pass several walls in order to cover the complete house 12 and the surrounding garden. The transmitting range 125A of the second signal S2 may for example be about 100 meters or more (free line-of-sight), preferably of 300 meters or more, for example at least between about 100 and 500 meters.

Next to this doorbell functionality via the push button, the doorbell is also transmitting default a low power signal S1 as a beacon 21. When the visitor 6 is in the possession of a smart phone 7, 107 with a bell companion App on it, his phone 7, 107 will notice the beacon signal S1 from within a transmitting range 25, 125 of for example a couple of meters, and will send via the computer system 10, for example cloud based, or via another communication system a push message (announcement) to the paired smart phone mobile devices 14, 114 in the vicinity (inside the house 12 or elsewhere, i.e. within the second communication range 125A). This push message will contain identification means such as a name of the visitor 6 and possibly a profile image.

This visitor (with smart phone 7, 107 and the app) may still ring the doorbell 16 via the button 17 and thus operate the switch 132. Since via the initial beacon 21, 121 interaction it is already known who the visitor 6 is, it is possible to launch a different sound on the smart phone 14, 114 on the receiving end (inside the house 12) based on the visitor 6. As an example a delivery courier 6 from for example PostNL or UPS could have a different 'bell-tone' than a normal visitor 6.

If nobody is home, one of the paired devices 14, 114 or its user is able to accept the incoming push message and start a dialogue (chat, audio, video) with the visitor 6 in front of the house 11. In this setup a camera and the technology of the smart phones 7, 107, 14, 114 on both sides may be used as the video doorbell 16. When nobody 'answers the door 12' the visitor 6 may then be able to leave a voice- and/or video message on or for the device 14, 114. Said message may be stored on a mobile device 7, 107, 14, 114, and/or on the computer system 10, wherein said information can for example be stored for a period of time, which period can for example be predefined or can be set by the user 14, 114.

The described smart doorbell system in this disclosure may provide for one, some or all of the following advantages. It is a relatively inexpensive solution, especially by using a Bluetooth beacon 21, 121 or similar circuitry 130 hardware whereas no separate receiver(s) is/are needed, since standard smart phones 7, 107, 14, 114 can act as receivers. Volume control is easy, just tune the volume of the phone 14, 114. Software such as an app can organize who is actually going to attend the door 12, whereas different 'bell-tones' can be assigned for different visitors 6, which may also allow different persons associated to the system to recognize whether a caller at the door may be there for him or her or for another person 4A. The doorbell may announce visitors 6 (also) from a distance (via beacon 21, 121 or similar circuitry 130, for example activated by the doorbell 16, 116) when the visitor 6 has a paired phone 7, 107 and the appropriate software, such as an app, or even when such visitor does not have such mobile phone or app available or is not as such known to the user. The visitors identity, for example by name and/or photo may be announced via a push message to people 4A in the house 11 and/or elsewhere, if that person is known and/or when a camera or other identification means is available at the door.

The appropriate software such as an app may allow the system to function as a full video doorbell system whereby the alert device, especially the beacon 21, 121 and/or circuitry 130 bootstraps a connection between two or more mobile devices 7, 107, 14, 114 with a video connection and by using the camera and the network connection of the smart phones, without the necessity of using for example a home WiFi network. An advantage of using Bluetooth can be that the Bluetooth 2.4 Ghz signal uses frequency hopping and has less problems with a crowded WiFi 2.4 Ghz space.

By way of example an alert device 21, 121 and a system 1, 101 provided therewith shall be described hereafter in relation to a doorbell system. This example should by no means be considered limited the scope of the disclosure.

The alert system 1, 101, such as doorbell device 21, 121 and system can be based on Bluetooth low energy beacon technology. In this description the Apple iBeacon specification (http://en.wikipedia.org/wiki/IBeacon) is used as example, but this does not be understood as limiting the scope to this solution. Other types of beacon technology can be implement in this system.

At the most simple form, an iBeacon is a Bluetooth low energy device 21, 121 forming or comprising or connected to circuitry 130, emitting advertisement following a strict format, that being an Apple defined iBeacon prefix, followed by a variable UUID, and a major, minor pair. The iBeacon specification also subscribes that the optimal transmit interval is 100 ms e.g. 10 advertisements per second. An example iBeacon advertisement frame could look like:

UUID=fb0b57a2-8228-44 cd-913a-94a122ba1206
Major=1
Minor=2

The doorbell in this disclosure can be an iBeacon with two embedded transmit profiles:

Profile 1

Default profile for the first signal S1, of which transmission starts as soon as the batteries are mounted in the device 21, 121 or otherwise power is provided to it.

UUID=xyz, major=a, minor=b, power=low, interval=100 ms

Profile 2

The second signal S2 or 'bell' profile, which is executed when the switch 132 is operated, for example when the doorbell knob 17 is pressed UUID=klm, major=r, minor=s, power=max, interval=20 ms The above profile parameters are just examples. It is also possible in Profile 2 to transmit a complete other Bluetooth package with dedicated content, which may not be according to the iBeacon standard, which can be received by at least the second smart phone mobile device(s) 14, 114.

When pressing the button on the bell, the hardware and transmission technology may be switched into high-power mode. For a short period of time, for example a couple of seconds, an extra strong second signal S2 with also a higher interval (e.g. 50 times per second) than the first signal S1 is transmitted. Preferably an as high as possible a range is obtained to be able to alert all phones 14, 114 in the house hand even around the house 11, for example in a garden behind the house 11.

In order to get a high range of a Bluetooth signal S2 the antenna design can be optimized. Such optimization is known in the art. For example a company like Texas Instruments (TI) delivers with it's Bluetooth chips application notes in order to optimize antenna design based on the application. In FIG. 11 different possible antenna designs are shown, suitable for use in the present system 1, 101.

For the discloses device 21, 121 and system 1, 101, such as a smart wireless doorbell system a design could comprise or consist of at least two separate circuits:
- a simple low cost PCB antenna design for the Profile 1 use case, i.e. for sending the first signal 1; and
- a second antenna design for Profile 2 including potentially a range extender chip, which gets activated when the switch 132 is operated, for example the button 17 of the doorbell 16, 116 is pressed. This antenna design may be such that it is directional so that the signal get's boosted in the direction of the house 11 and not, or at least less towards the front and a street at which the house 11 is situated.

Moreover, a further signal S3 may be transmitted in order to establish a communication via a computer and/or internet network 10. This can be a separate circuitry or it can be integrated. A further antenna can be provided if the further signal S3 is to be wireless.

In this disclosure an alert system and device 1, 101, 21, 121 are described which can be used in a delivery system and method for delivering items to premises such as houses or the like.

Beacons such as the Apple iBeacon® are designed to prevent the beacon from creating events repeatedly for the same device within a given period of time. For example in order to avoid that when a user moves his mobile device around the beacon during such period he would get an alert signal repeatedly of his proximity to said beacon. To this end the software can be set to block detecting said beacon a second time within for example 30 seconds after having been detected a first time. When using such software in an alert system 1, 101 or for an alert device 21, 121 of this disclosure this would mean that operating the switch 132 a second time within said time frame would not result in another alert on the device 14, 114 of the user 4A, which could be problematic or at least disadvantageous. In order to avoid this in a system according to the disclosure part of the code transmitted by or with the second signal S2 could be changed periodically or when the switch 132 is operated a second time within such time frame, such that the software does recognize the second signal as coming from said beacon without triggering said blocking. Similarly preferably re-ringing the doorbell 16, 116 should be detected in systems of for example FIG. 12-14 wherein a doorbell is used for activating the system.

In an embodiment this could be provided for by changing a combination of the major and minor in the example as given each time the switch 132 or doorbell 16, 116 is operated or at least when operated twice in said time frame. This would suggest to the mobile device 14, 114 that each time it is a different beacon 21, 121 sending the signal S2. The software on the device 14, 114 can then be designed to recognize each of these second signals as coming from the same beacon 21, 121. Thus each operation of the switch 132 can then trigger the alert signal on the device 14, 114, even within such time frame. Preferably the UUID is maintained the same for each signal S2, which may avoid additional costs.

In the embodiments described here above the circuitry and especially the button or switch 17, 132 and the transmitters for the first and second signal were shown incorporated in a single device or housing. It will be clear that the circuitry and especially the transmitters for the first and second signal can be divided over at least two devices or housings. For example the transmitter for the first signal can be provided in a first device or housing, such as for example but not limited to a doorbell 16, 116 and/or beacon 21, 121. Whereas the transmitter for the second signal can be provided in or by the first hand held device 7, 107. In such embodiments the first hand held device can receive and recognize the first signal and can comprise software, such as but not limited to an app, to act on the bases of such recognition, by for example directly or indirectly activating the second transmitter for sending out the second signal. Indirectly here has to be understood as that at least one action has to be taken, preferably by the user of the first hand held device, in between recognition of the first signal and activating the transmitter for sending out the second signal. For example a switch 132 can be presented to the user of the first hand held device or the doorbell 16, 116 could be used to that end. Activating said switch 132 or the doorbell 16, 116 may then result in sending the second signal. Other option may be provided to the user, as described here before and after, such as for example but not limited to presenting a non-available signal, an alternative delivery address or delivery time, a message or message service or the like.

Additionally or alternatively the first hand held device may receive the first signal which contains or is formed by an identifier for for example a hand held device or a computer of a person associated with the first signal. This can for example be a mobile phone number, an IP address, an identifier for a social network or the like. This can be a coded identifier, such that the user of the first hand held device cannot read it, store it or the like actively. Upon recognition of the first signal then an option can be presented to the user of the first hand held device to establish a communication link with a device associated with said identifier, such as a mobile phone, smart phone, tablet, computer or the like. In embodiments this can be a communication link via a mobile or otherwise wireless network such as but not limited to GSM, GPRS, UMTS, 3G, 4G or the like. The communication link can be established directly or via a computer network of the system, as described herein.

When for use in a delivery system, for example as described herein, a user such as an addressee may be provided with means to enter into the system that he expects a delivery. This can for example be done at a visit to a web shop ordering an item to be delivered, by the user or by the web shop. This can also be enabled by the computer system, for example through a link, a personal data page of said user or a request form or the like. This information will then be transferred to the first hand held device of a delivery person who will deliver said item. Then if the first hand held device of said delivery person receives and recognizes the signal S from the beacon 21, 121 of the addressee, the first hand held device 7, 107 may ignore said signal if no delivery at that address is expected. Especially where multiple signals S from a series of beacons 21, 121 is received at the same location, for example in a densely build area, an apartment building, a building comprising multiple condos, student housing or the like, this will significantly reduce the information presented on the delivery persons first hand held device to choose from, such as switches, doorbells, alternative addresses, locations, alternative delivery times and the like.

In embodiments the beacon 21, 121 may be provided with a hardware and/or software switch, such that it can be set for example via Blue Tooth or WiFi or a computer network, in either one of at least two modes or settings. The first setting may be an indication that a delivery is expected at a certain time or time frame, the second setting that no such delivery is expected. The setting may be transmitted with the signal S. Thus, when an alert or first signal S is received and possibly recognized by a hand held device, and the setting is recognized as the second setting, the first hand held device may ignore said signal S, whereas if the setting is the first setting, it will process the signal as discussed before and hereafter.

The software of the first hand held device may be designed to enable recognizing the said setting or not. In the latter case each said signal S received will provide for information shown on the first hand held device, irrespective of whether a delivery is expected or not.

Alternatively a beacon 21, 121 may allow at least a third setting, which may be recognized by said software as a setting for specific types of deliveries. For example a setting for whether or not a user wants to receive general items, for example items have no specific addressee, such as for example door to door advertisement brochures, door to door newspapers, leaflets and the like. Such setting can be comparable to an electronic version of a "Yes/No" sticker regarding advertisements on a letterbox. Such alternative settings could be made available for individual or groups of types of items delivered.

In this description an item or a delivery have to be understood as meaning one or more elements or items which by itself or together have to be delivered to a single intended address and addressee. "an item" to be delivered can therefore also be a plurality of items, unless specifically indicated differently, and may be similar to "a delivery" when the latter is used as a noun.

In this description a communication system may comprise or be formed by any suitable communication devices for communicating data such as address data between two electronic devices. A communication system can for example comprise a hand held device such as a mobile or smart phone, tablet or laptop computer, Wi-Fi or Bluetooth® based system, radio transmitter or similar system for communication, preferably wireless communication. A communication within the meaning of this disclosure can also comprise stationary communication devices, which may communication via known or dedicated wire based or wireless protocols.

In this description a delivery vehicle can be any vehicle suitable for transporting and delivering items, such as but not limited to a car, van, truck, bike, motorbike, moped, drone or a push cart or the like. A delivery person should be understood as meaning at least one person involved with making a delivery of a delivery or item to a delivery address.

In this description an intended delivery address should be understood as an address initially provided to a delivery service or an organization requesting such delivery service to make the delivery, for example an address of delivery entered by an addressee or consumer upon ordering an item. An alternative address has to be understood as an address for delivery alternative to the intended delivery address or to another alternative delivery address.

In a system according to the present disclosure deliveries can be made to a delivery address, which may be an intended delivery address. If delivery at the intended delivery address is not possible, for example because the addressee is not in a position to receive it, an alternative delivery address can be provided to the delivery person, so as to allow him to deliver the delivery cq item nevertheless. In embodiments the at least one alternative delivery address can be provided real time by the addressee, for example to a communication system of the delivery person or delivery vehicle or presented on a screen at the intended delivery address. In embodiments at least one alternative delivery address can be provided prior to or during a delivery route executed by the delivery person and/or vehicle.

Alternative delivery addresses can for example be provided from a database of the delivery system or can be entered into a communication system provided to the addressee. To that end the delivery system, for example the communication system provided to the addressee, can comprise a door bell system having or connected to a screen, such that the at least one alternative delivery address can be presented on said screen to the delivery person. Said screen can for example be provided at or near the intended delivery address or can be part of a device provided to the delivery person, such as but not limited to a hand held device such as a mobile phone smart phone or tablet. The door bell system can comprise a hard ware door bell and/or a virtual door bell, for example presented on a hand held device such as a mobile phone, smart phone or tablet issued to the delivery person and/or in the delivery vehicle, for example via the described proximity system.

In this description proximity is to be understood as a person, e.g. a delivery person and/or vehicle, e.g. a delivery vehicle being within a predetermined range from an intended delivery address. A proximity signal can at least be understood as a signal generated when said proximity is obtained, that is at least comprising a signal generated, indicating that a vehicle e.g. a delivery vehicle and/or person, e.g. a delivery person enters into said predetermined range from a delivery address. Such proximity signal can for example be generated by and/or received by a wireless beacon positioned at or near the relevant address, e.g. a delivery address, communicating with a device held by the relevant person, e.g. a delivery person or provided in the vehicle, e.g. a delivery vehicle. For example but not limited to a signal generated when a hand held device of the person, e.g. a delivery person is brought within said proximity of a wireless beacon provided at or near the address, e.g. a delivery address, which pair or have been paired with each other, such that it is recognized that the hand held device and therefor the person is within said proximity. Alternative to the beacon the position of the person and/or vehicle can be established using GPS type systems, with which the proximity can be defined. A further example could be using a visual recognition system, such as but not limited to Layar® or Google Glass®, with which the position of a delivery person and/or delivery vehicle could be assessed, for generating the proximity signal. A proximity signal can also be a position signal or an approach signal.

In this description a beacon, especially a wireless beacon, is to be understood as at least encompassing a device or element which periodically or constantly emits a signal, especially a wireless signal forming or including a code, especially a unique code, identifying said beacon to an apparatus designed for recognizing said signal. To that end for example such apparatus can be provided with software, such as an app, and a receiver for said signal, such that such apparatus can define the identity of the beacon and, for example via a database, for example the identity of the address where the beacon is provided, personal information of an addressee associated with such address and/or beacon and/or information associated with an item to be delivered at said address and/or to said addressee.

A proximity signal, position signal or approach signal can be used for early recognition of a delivery person and/or vehicle in the vicinity of an intended delivery address of or even for example recognizing such vehicle starting to move in the direction of an intended address for delivery of an item. Such recognition will for example enable an addressee to move to the intended delivery address or prepare for receiving said item at said address or have it received by a third person, or for example indicate that he will not be in a position to receive the item at the intended delivery address and/or at an intended time of delivery, in which case an alternative address for delivery and/or an alternative time for delivery can be provided to the delivery person and/or delivery vehicle, as described herein. Such may for example avoid the delivery person having to get out of the vehicle at the intended delivery address or even avoid the delivery person to go all the way to the intended delivery address. He can then for directly continue his delivery route, can rearrange the delivery addresses of his route and/or the time schedule, or can take other appropriate action. In an advantages embodiment the delivery route can be adjusted, preferably automatically, when a delivery address is changed during the execution of said delivery route, such that at all times the most efficient delivery route is defined for the delivery person cq delivery vehicle.

In a system according to the description the software can be set such that only proximity signals, approach signals and/or position signals are generated or at least recognized of addressees and/or delivery addresses for which items to be delivered are carried by the delivery person or delivery vehicle.

In this description where reference is made to an addressee or delivery person, the male form may be used, which should however be understood as that it can also be the female form.

FIG. 1 schematically shows a delivery system 1, comprising a computer 10 and a database 2 in which data is stored about items 3 to be delivered and intended delivery addresses 4 and addressees 4A to which the items are to be delivered. For each item 3 an intended delivery address and addressee 4A is stored in the database 2. At least one vehicle 5, here shown as a van, by way of example only, is provided for delivering the items 3. The vehicle 5 and/or a delivery person 6 assigned to said vehicle 5, for example a driver, is provided with a first communication system 7. This first communication system 7 preferably at least comprises a hand held device and/or a vehicle mounted device 7A in which at least one and preferably a series of items 3 to be delivered and related intended delivery addresses are stored, to be communicated to the delivery person 6, for example by showing these data on a screen 8 of the first communication system 7, for example on the hand held device 7A and/or in the vehicle 5. The communication system 7 can further be provided with or connected to a GPS system 9 for defining a delivery route, based on the delivery addresses as stored. Such delivery route may be generated by the system 7 or the computer 10 or by any other suitable means in a known manner known in the art, for example using a device as provided by TomTom or Google maps.

An intended delivery address 4 can be any private and/or commercial property, here shown as a house 11 with a front door 12. An addressee 4A is provided with a second communication system 13, which can provide a redirect signal, which may be or comprise an alternative delivery address 4B. The second communication system 13 can comprise a hand held device 14 and/or a stationary device 15. Such stationary device 15 can for example be mounted next to the door 12, at an outside of the house 11, such that it can be approached by a delivery person for use and/or inspection. The hand held device 14 can for example be a mobile telephone, a smart phone or a tablet.

A stationary device 15 can comprise a door bell system 16 comprising a door bell 17, a doorbell control system 18 and an electronic screen 19 for presenting information. The control system can comprise a memory 20 and an interface 23 for presenting information from the memory 20 onto the screen 19, visible to somebody approaching the door 12. Additionally or alternatively the doorbell system can comprise an input unit 31 for entering data into the doorbell system 16, for example via a key board or, using a communication unit 22, via a device held by the addressee 4A, such as a hand held device 14, for example a mobile phone, a smart phone or a tablet. This can be done via a wired system or, preferably, wireless, such as by Wi-Fi, Bluetooth® or phone band, such as but not limited to GSM, or using an appropriate Internet protocol. Alternatively the doorbell system 16 can be as described before, for example according to FIG. 12-14, suitable for activating the system.

A system 1 can for example be used as follows. A route for delivery is defined for the vehicle 5, based on the intended addresses for the items 3 to be delivered. Then the vehicle will move in the direction of the first address on the route, for delivery of the first item 3. At the intended address 4, i.e. the house 11 the delivery person will ring the doorbell 17. If the addressee 4A is in a position to accept the delivery he will open the door 12 and the item 3 can be delivered. However, if the addressee 4A is not in a position to accept the delivery, an alternative delivery address 4B can be provided to the delivery person 5.

In a first embodiment the alternative delivery address can have been provided by the addressee prior to the delivery, visible on the screen 19. The delivery person will read the alternative delivery address 4B and can add this alternative address to the route, for delivery of the item at the alternative delivery address.

In a second embodiment ringing the doorbell 17 can set off a timer in the doorbell system 16. When a predetermined period after ringing has been passed a non-available signal may be generated by the doorbell system 16. In an embodiment the non-available signal will set off the interface 23 for presenting an alternative delivery address 4B on the screen 19. In an embodiment the non-available signal may be communicated by the communication unit to the device 14 held by the addressee 4A. This can be done after said predetermined period or may be done directly upon ringing of the doorbell 17. The addressee 4A can then communicate with the communication device of the doorbell system 16, in order to set off the interface 23 for presenting an alternative delivery address 4B on the screen 19.

The alternative address 4B may then be retrieved from the memory 20 or may be entered directly into the input device by the addressee 4A, through the communication device.

In a further embodiment the non-available signal may be communicated to the computer 10. The computer 10 can then provide an alternative delivery address, for example retrieved from the database, and can communicate this to the doorbell system for presentation on the screen 19.

Alternative to or in addition the alternative delivery address 4B can be provided to the first communication system 7, for example for presentation on a screen on a hand held device 7A of the delivery person or into the GPS system. The alternative delivery address 4B can then be added to the route or can be used for recalculating the route in order to optimize the route, taking into consideration the alternative delivery address 4B. Also an auditive signal can be provided to the first communication system, such as the hand held device 7A, in order to inform the delivery person 6.

FIG. 2 shows a system similar to that of FIG. 1. However, in this embodiment the vehicle 5 is provided additionally with a tracking system 24, for example coupled to the GPS system. The tracking system 24 can determine the position of the vehicle 5 and can provide an approach signal when the vehicle enters into a predetermined range relative to the intended delivery address. This range may be a range in distance or estimate time to arrival at the intended delivery address 4. In FIG. 2 this range has been represented as a circle 25 around the intended delivery address 4.

The approach signal can be provided to the addressee 4A, for example by sending it to the second communication system 13, especially to the device 13 held by the addressee and/or to the stationary device 15.

When sent to the addressee 4A, the addressee can send a non-available signal to the stationary device 15, for presenting an alternative delivery address on the screen, in any way as discussed here before with respect to FIG. 1, or can make himself available for receipt of the delivery at the intended address. Sending a non-available signal can be automatic or can be done actively by the addressee 4A. When sent to the stationary device 15, the stationary device may be set to respond to the first communication device indicating whether the addressee will be available for receipt of the delivery cq item 3 or not. In the latter case an alternative delivery address will be provided to the first communication system, especially to the delivery person, and/or to the GPS and/or tracking device for recalculating the delivery route at an early stage, i.e. well prior to the vehicle arriving at the intended delivery address. Obviously the route can also be (re)calculated by the computer.

FIG. 3 shows a doorbell system 16 system, comprising the doorbell 17 and optionally a screen 19. Also a camera 26 is provided, and a communication unit 22, suitable for communication at least with a hand held device 14, such as a mobile phone, smart phone or tablet. This doorbell system 16 may be similar to that as described before, and allows the user of the hand held device to get images from the camera 26 presented to him on his hand held device. Preferably a microphone 27 is also provided, allowing two-way communication with a person ringing the doorbell 17. If that person is for example a delivery person, again an alternative delivery address 4B may be provided to him, for example eon the screen 19 or on the first communication system, as described. Additionally or alternatively other information may be provided to said person, audibly and/or visually and based on for example the image shown to him and/or further information provided the holder of the hand held device 14 can decide to take further action, such as remotely opening a door, gate or such closure, connecting the person at the door to another person such as for example a neighbor or informing official bodies such as the police, should such appear necessary.

FIG. 4 shows a further embodiment of a system, wherein schematically an intended address 4 is represented by a house 11 with a door 12, close to which a beacon 21 is provided. This beacon 21 may be incorporated in a stationary device 15 or doorbell system 16 as described before, or can be provided by itself. The beacon 21 is preferably a device which can communicate wireless with the first communication system 7 when within a communication range of said beacon 21. For example the beacon 21 can be a known wireless Wi-Fi beacon or Bluetooth® beacon or another, preferably short range wireless beacon, communicating with a hand held device 7A of the delivery person 6 and/or a similar device in the delivery vehicle 5. Such beacons and communication protocols are well known in the art.

In advantageous embodiments the beacon 21 can be or provided with or be part of an alert device 21, 121 or alert system 1, 101 as previously described. This may be advantageous, for example because the alert signal within the premise 11 will be heard and recognized better, and will allow direct communication between the delivery person 6 and the addressee 4A in an easy manner.

The beacon 21 may periodically, intermittently or constantly emit a signal, preferably a coded signal indicative for the beacon 21, such as a coded Wi-Fi or Bluetooth® signal. The code is preferably unique to said beacon 21. The beacon 21 and the relevant code is preferably known to the system 1, for example stored in the computer 10 or database 2. The first communication system 7, such as the hand held device 7A, can then be provided with software such as an app which recognizes the beacon 21 by its signal and/or the code. The signal can be understood as a proximity signal. Preferably the beacon 21 can be set for different ranges, for example but not limited to a first range up to a few meters, a second range up to 10 to 15 meters and a third range up to about 75 to 100 meters. Thus for example an addressee 4A can set his beacon 21 for one of these ranges, depending on how soon he wants a proximity signal to be provided. In FIG. 4 schematically the ranges are indicated by R1, R2 and R3 respectively.

Once the beacon 21 is recognized by the first communication system 7 by said proximity signal, different events can occur.

The proximity signal can set the software in the first communication system to show a link L on the screen 8 of the hand held device 7A and/or in the vehicle 5, which can for example represent a virtual door bell 17. By activating said link L and/or by pressing the doorbell 16, 116 the delivery person 6 can inform the addressee 4 of his proximity, for example through a physical bell (chime 140) at the intended address 4 and/or through a attention signal A, for example received on his computer or on a hand held device 14 of the second communication system 13, for example by sound, vibration and/or image, in FIG. 5 represented by "WIZZ". Preferably the link L on the screen 8 will only be shown when the relevant device 7A of the first communication system 7 can recognize the relevant beacon 21, for example by having been paired with it through the computer and database 2, this event can only occur through the first communication system 7 and thus the addressee 4A will know that the signal A received comes from a known party. The software such as an app of the first communication system may be set such that the identity of the device 7A communicating with the beacon 21 also becomes known to the addressee 4A.

When the addressee receives said attention signal A, for example on his hand held device 7A, a communication link may be established between the first and second communication systems 7, 13, for example between the hand held devices 7A and 14 or between the hand held device 14 and the device 15 or door bell system 16. This can allow the addressee 4A to communicate with the deliver person 6, for example in order to provide him with instructions. These instructions may include an alternative delivery address 4B and/or an alternative delivery time, or a refusal of the item 3 or the like. Alternatively the addressee can initiate that an alternative delivery address and/or time is provided to the delivery person directly, for example as such link. Said alternative delivery address 4B can for example be retrieved from the database 2 or the memory 23 of the fixed device 15 or door bell system 16. This can for example be initiated by issuing a non-availability signal to the first communication system 7 and/or the computer 10. The non availability signal can be generated by the system when the addressee has indicated such in or to the system 1. For example by means of an input device 22 or via his hand held device 14. In such embodiment when the first communication system 7 communicates with the beacon 21, issuing the proximity signal, the non availability signal is generated or received by the first communication system.

In an embodiment this hand held device 14 can be provided with software, for example an app with which the system can automatically detect when the hand held device 14 is outside a predetermined range of the intended delivery address 4A, which will then set the system 1 to generate said non availability signal. Such detection can for example be done through the beacon 21 or via GPS tracking of the hand held device 14 or other suitable means.

In stead of the link L an alternative delivery address 4B can be provided directly on the screen 8 for the delivery person 6 and/or delivery vehicle 5, for example as shown in FIG. 6 on the screen 8 of hand held device 7A, in FIG. 6 represented by "TEXT". This can be provided automatically on the screen 8, that is without involvement of the addressee, for example after receipt of the non-availability signal.

In embodiments a series of links L and/or alternative delivery addresses 4B can be shown, for example as pictograms on a map, as schematically shown in FIG. 7. In FIG. 7 a map is shown on the screen 8, showing the intended delivery address 4 as well as a series of alternative delivery addresses 4B, associated with the intended delivery address 4 and/or the addressee 4A. In FIG. 7 alternative delivery addresses 4B are shown within a certain range from the intended delivery address 4, for example a few hundred meters. In embodiments only alternative delivery addresses can be shown available for receiving the item 3. Alternatively all alternative delivery addresses 4B, associated with the intended delivery address 4 and/or the addressee 4A within said range can be shown, of which for example by color differences or otherwise differentiating between such addresses available for receipt of items 3 and such addresses not available for such receipt. For example green for available and red for not available. This will allow the delivery person 6 to chose the most suitable alternative address. Preferably the relevant pictogram will be a hyperlink to the actual address information which may show up by initiating the (hyper)link or by a "mouse over" showing the information directly on the screen 8. Preferably the delivery person can chose one of the alternative addresses 4B and add it to the delivery route. In embodiments the system 1 may show to the delivery person for some or all of the alternative delivery addresses 4B the consequences of choosing that address 4B, for example for the remaining delivery route, the ETA for the items 3 to be delivered and the like information, in order to even better assess the most appropriate delivery route. In embodiments the delivery person 6 may be able to change the range within which alternative delivery addresses may be found, for example by zooming in or out on the screen 8. Obviously in the other embodiments also the or each alternative address or link can be represented differently, for example on a map, by graphic images or as a list and/or as delivery alternative routes including different alternative delivery addresses In all embodiments the screen 8 is preferably a touch screen.

In embodiments a non availability signal can be sent directly by the second communication system 13 or by the computer 10, for example through the hand held device 14, to the first communication system 7, once the addressee 4 has indicated to the system 1 that he is or will not be available for receipt of an item 3 at the intended delivery address 4, at an estimated or indicated delivery time, to be processed by the computer 10 or to be shown on the hand held device 7A. Such non availability signal can for example be generated based on an agenda of the addressee 4A. A non availability signal can then for example be defined by periods in such agenda from which it follows that the addressee will not be available for such receipt of an item. Additionally or alternatively an addressee may be provided with the opportunity to indicate such periods of non availability directly in the system 1, for example through a web site associated therewith.

In embodiments the non availability signal indicating one or more periods in which the addressee will not be available for receipt of an item 3, can be set in the system 1, for example actively by the addressee or through an agenda of the addressee communicating with the system 1. This will allow the system for example to calculate a delivery route in which the relevant address can be approached at a period in which the addressee will be available for receipt, or by adding an alternative address 4B to the delivery route instead of the intended delivery address 4.

An approach signal or proximity signal as described can inform an addressee about an estimated time of arrival (ETA), which for the proximity signal may be relatively short, for example seconds or minutes, and for the approach signal may be longer, for example minutes to tens of minutes or even longer. Alternatively or additionally the ETA can be communicated to the system 1, especially to the computer 10 and/or the first communication system 7, such that for example the position of the delivery person 6 and/or vehicle 5 can be assessed, that ETA's for one or more of the further addresses where deliveries have to be made in the relevant delivery route can be calculated and the route can be amended based on such ETA's and/or it can be assessed whether the addressee will be available at the intended delivery address at the ETA and, if not, an alternative delivery address or delivery time can be provided.

During his delivery route a delivery person 6 and/or delivery truck may pass a series of beacons 21, some of which are not associated with items 3 to be delivered during the delivery route. Proximity and/or approach signals from and/or to such beacons 21 may nevertheless be used by the system 1. For example by tracking the time when the said signal is exchanged with such beacons 21 the position and/or progress of the vehicle and/or delivery person 6 can be calculated, allowing a periodical or constant calculation of ETA's for addresses along the delivery route. The data about the progress of the vehicle 5 and/or delivery person 6 during several delivery routes can be stored in the system 1, for example in the database 2, to be used during future delivery routes, in order to more accurately define ETA's. The system 1 can thus be self learning. Also the data from the progress and/or position of the vehicle can be combined with further information available about for example traffic and/or traffic jams along the calculated route, road works, detours and the like for further optimizing the delivery route.

In the description given here before, the proximity signal is provided by the beacon 21 being positioned at a delivery address 4, actively issuing a signal, to be detected by the first communication system, especially the hand held device 7A. Obviously such beacon 21 can also be a passive element, such as a transponder, which provides a signal only when the hand held device 7A is brought into a predetermined proximity of the transponder. Furthermore the process can be initiated in embodiments by pressing the doorbell 16, 116.

When the first communication system, especially the hand held device 7A of the delivery person 6 and/or the delivery vehicle 5 is in proximity of a number of possibly relevant beacons 21, a link 21A for some or all of these beacons 21 may come up, which means that the delivery person 6 will have to chose the right one. Alternatively software of the system 1 may be designed such that the first communication system 7 will only provide a link for those delivery addresses and/or addressees for whom the delivery person 6 or delivery vehicle 5 is carrying an item 3 to be delivered. Such link may again be provided on the screen 8 of the hand held device 7A. This will significantly limit the number of links shown, even in a crowed area such as for example an apartment building. Again such links can be represented by a virtual door bell or an alternative delivery address or a communication link for establishing communication with the addressee.

In this description an addressee can define a network of alternative delivery addresses from which an alternative delivery address can be chosen by the system and/or the delivery person, depending on for example the further deliveries to be made, availability of people at these alternative delivery addresses and the like. Preferably an addressee can define a preferred order of the alternative delivery addresses. Preferably the availability of people at such alternative delivery addresses 4B will be known or can be made known to the system 1, similar as that of the intended addressee 4.

Alternative to or additional to a beacon 21 the position of the delivery person 6 and/or vehicle 5 can be established using GPS type systems, with which the proximity can be defined, as described before. A further example could be using a visual recognition system, such as but not limited to Layar® or Google Glass®, with which the position of a delivery person 6 and/or delivery vehicle 5 could be assessed, for generating the proximity signal. For example a delivery person can periodically or constantly take in images of the environment, which will be recognized through appropriate image recognition software of the system, such that the position of the delivery person cq vehicle can be assessed. In an embodiment the software can extract an image of the intended delivery address or of one or more positions along the delivery route with a known position relative to the intended delivery address, for example from Google® Map's street view or Layar®. The software of the system 1 can then compare the images taken along the route by the delivery person and/or vehicle with these images of the intended delivery address and/or positions along the delivery route and when a match is found define the position of the delivery person and/or vehicle relative to the intended delivery address.

In alternative embodiments an item can be provided with a delivery code, such as a bar code or a QR code or the like, which can be scanned by the delivery person, for example with the hand held device 7, for example when a door bell 16 is not answered at the intended delivery address. The scanned code can then provide the delivery person with an alternative delivery address or a link as discussed before, presented on the screen 8 of the hand held device 7 or vehicle 5. The code can be generated by the system 1 based on information presented by a person ordering an item 3, for example through a website, such that the information is scrambled in said code and the information as such will not become available to the delivery person 6, but the link will allow him to establish a connection with the addressee, for example through a mobile phone number, for communication or information or provide an alternative delivery address. In such embodiment the information may be scrambled into said code directly after entering the information into the website, such that only said code is stored in the database, wherein the software of the first communication system can translate said code into the desired link.

As discussed a system 1 according to the disclosure can define a delivery route for a series of items to be delivered, based on e.g. at least one of:
  location of the intended delivery addresses;
  indicated availability or non-availability of the addressees;
  traffic information;
  data stored in the system about earlier delivery routes, alternative delivery addresses provided and other information.

During execution of the delivery route the delivery route can be changed, such as optimized, and/or an alternative delivery route for the remaining items 3 to be delivered can be provided by the system 1, by recalculation, based on further information fed into the system and/or generated by the system 1, preferably real time, for example about at least one of:
  a non-availability signal entered into the system:
    by the addressee 4A through the second communication system 13; or
    generated by the system 1 due to for example a change in an agenda of an addressee 4A, said agenda communicating with the system 1, such as for example but not limited to an Outlook® agenda; or
    due to a change in a calculated ETA, for example due to an unexpected delay along the delivery route for the delivery person 6 and/or vehicle 5, due to for example but not limited to a traffic accident, road works, or a delay during the delivery of an item;
  an alternative delivery address 4B entered into the system by the addressee 4A directly, for example for personal reasons; and/or
  traffic information entered into the system 1, for example but not limited to information about blocked roads, traffic jams and the like.

Preferably the delivery person can chose to progress with the originally calculated delivery route or follow the further alternative delivery route for the remaining items as proposed by the system. During the execution of the delivery route preferably the addressees of the items 3 to be delivered and/or, if alternative addresses are provided for some or all of the items, a contact person at the alternative address or addresses are preferably informed about the progress of the execution of the delivery route and/or of any changes in said delivery route. This can for example be done through a website or app which shows to an addressee of an item 3 the location of a vehicle 5 and/or delivery person 6 carrying said item 3 on a map, preferably real time. To this end the addressee 4A and/or the said contact person or persons of the alternative address(es) 4B can be provided with a login code identifying him as associated with a specific item or number of items 3. This will allow tracking of the item 3, preferably real time. This website or app can be part of the second communication system, such that it will allow the addressee and/or said contact person to communicate with the first communication system 7 and/or other elements of the system 1, for example a communication device 7A of a or another contact person through said web site or said app.

In a system 1 according to this disclosure in embodiments also the possibility can be offered to enter a pick up request, requesting a delivery person 6 and/or vehicle 5 to pick up one or more items 3 at an address 4, to be referred to as a pick up address, for example an item 3 previously delivered at such address 4, to be returned to a sender and/or to be delivered to a different address. If such pick up request is entered into the system 1 it can be incorporated into a delivery route. When such pick up request is entered into the system 1 it can be processed, for example by incorporating it into a delivery route which is to be executed later, or by incorporating it into a delivery route during execution of such delivery route, which will lead to calculating an alternative deliver route or at least for a remaining part of said delivery route.

In embodiments a series of alternative delivery addresses can be provided to the delivery person and/or the delivery truck, such that the delivery person can chose one of these addresses, for example an address fitting his route best, or can try one or several of these addresses for making the delivery.

If a delivery of an item is made to an alternative delivery address, it is preferred that signal is sent to the addressee informing him of the delivery and the address at which it has been delivered. In embodiments alternative delivery addresses may be retrieved from a social network of which the addressee is a member.

In the present disclosure all features associated with the delivery system could also be incorporated into or used with an alert system 1, 101 as described using an alert device 21, 121 as described.

In embodiments of a system as disclosed, especially but not limited to a system formed by a system or system part as shown in FIG. 12-14 or a system comprising a system or system part as shown in FIG. 12-14, it may be relatively easy to amend an existing door bell system to be retro fitted since the existing door bell system can be used by providing at least one sensor close to or connected to the door bell system, especially the chime thereof. The sensor could be connected to the system wired or wireless, or can receive a signal from the chime. Alternatively a door bell system can be dedicated to a system according to the disclosure.

With a system according to the present disclosure safety can be increased, for example to users of the relevant premises, for example because the system may allow assessment of who is at the door prior to opening the door, for example by viewing the visitor through the mobile phone or video phone, or recognizing the visitor by the alert signal exchange. This can even be possible when the user is not at the premises. The system can allow to give the visitor the impression that the user is at the premises, even if he or she is not.

In embodiments the system will allow a user to become aware of the door bell being rung, even if he or she cannot hear the chime. This may allow the user to engage in a conversation with the visitor, directly or for example by predefined communications, such as predefined texts and instructions, Whatsapp, SMS or similar communications, (video)chat or a direct telephone conversation.

In embodiments a system as disclosed can comprise a memory or use memory available in a computer or internee system connected to or associated with such system for registering system based information. For example a log can be provided of any visitors who have approached the premises, who have rung the door bell and/or what signals $S_1$, $S_2$, $S_3$ and/or $S_4$ or any other system based signals have been transmitted and/or received, and for example time stamping such entries in such log.

The invention is by no means limited to the embodiments as shown and/or described in this description. Many variations thereof are possible within the scope of the claims, including at least all combinations of parts and elements of the embodiments and parts thereof shown, in any combination or permutation. For example by combining systems parts according to embodiment of FIG. 12-14 with any of the systems according to any one of FIG. 1-11.

These and other alterations and modifications are supposed to be disclosed within the scope of the claims.

The invention claimed is:

1. A delivery system, comprising a database comprising data relating to at least one delivery to be made and at least one intended delivery address for an addressee for said delivery, and at least one delivery vehicle,
    wherein the delivery vehicle and/or a delivery person designated to said vehicle is provided with a first communication system; and
    the at least one addressee is provided with a second communication system,
    the delivery system further comprising a computer system for providing data from the database to the first communication system, said data formed by or including data about the at least one delivery and said delivery address,
    wherein the delivery system further comprises a proximity detection system comprising at least one beacon at the delivery address, for communicating wireless with the first communication system when part of the first communication system is within a wireless communication range of said at least one beacon; and
    wherein the second communication system is designed for communicating with the first communication system for providing an alternative delivery address for the delivery, especially during the delivery of said item and/or
    wherein the computer system is designed for providing at least one alternative delivery address during delivery, said alternative delivery address provided from the database.

2. The delivery system according to claim 1, wherein the proximity detection system is provided with a module presenting a visual and/or auditive signal on the first communication system when the proximity detection system detects proximity of the delivery vehicle and/or the delivery person, wherein the said visual and/or auditive signal comprises a representation of a virtual door bell.

3. The delivery system according to claim 1, wherein the computer system is programmed to provide the at least one alternative delivery address to the first communication system when a non-available signal is provided from the second communication system or from the data base.

4. The delivery system according to claim 1, wherein the delivery system allows the second communication system to provide a redirect signal indicating at least one alternative address for delivery to the first communication system.

5. The delivery system according to claim 1, wherein the second communication system comprises at least one of:
    a hand held communication device; and
    a stationary communication device.

6. The delivery system according to claim 1, wherein the second communication system comprises a hand held communication device and the first communication system and/or the proximity detection system comprises a signal unit providing a signal to the hand held device, and wherein the delivery system is designed such that:
    at least one alternative delivery address is presented on the first communication system, which at least one alternative delivery address is derived from the database or has been entered in the second communication device.

7. The delivery system according to claim 1, wherein a delivery code is associated with a delivery to be made, which delivery code is associated with at least a communication means for communication between the first and second communication system, such that upon activation of said delivery code a communication is established between the first and second communication system.

8. The delivery system according to claim 1, wherein the computer system is designed for calculating a delivery route for the delivery vehicle and for recalculating a route based on inter alia an alternative delivery address provided for a delivery during the delivery.

9. The delivery system according to claim 1, wherein:
in the at least one first hand held device for at least a series of first signals an indication is provided whether a delivery is expected for an address and/or addressee related to said recognition code; and/or
the first signal is provided with an indication, or accompanied by a further signal comprising an indication, to the first hand held device, whether a delivery is expected for an address and/or addressee associated with said first signal, and/or
in the first hand held device a list of first signals is provided for which deliveries are to be made;
wherein the first hand held device is designed for ignoring a first signal received and/or not presenting any information associated to said first signal to the user of said first hand held device when no delivery is present for said address and/or addressee.

10. A method for delivery of at least one item to at least one delivery address of an addressee of the item,
wherein an intended delivery address for said item is entered into a first communication system available to a delivery person; and
wherein, during delivery of the item, proximity of a delivery person and/or delivery vehicle associated to said delivery person to the intended delivery address is detected;
wherein said proximity is detected wireless by means of at least one beacon at the delivery address, communicating wireless with the first communication system when part of the first communication system is brought within a wireless communication range of said at least one beacon and/or by activating a doorbell system of the delivery address;
wherein when said proximity is within a predetermined range a proximity signal is provided to the first communication means and/or to a second communication means held by the addressee or a person associated to the addressee, such that a communication can be established between the first and second communication means.

11. The method according to claim 10, wherein when proximity within said predetermined range is detected at least a link is presented on the first communication means, enabling the delivery person to establish a communication with the second communication means by activating said link.

12. The method according to claim 10, wherein at least one alternative delivery address for the item is provided to the delivery person, prior to or during delivery of said item, which alternative delivery address is provided:
via the second communication system to the delivery person and/or
via a computer system to the first communication system and/or to the second communication system, said alternative delivery address provided from a database connected to the computer system,
wherein during delivery an approach signal is communicated to the second communication system, when the delivery person enters a predetermined range relative to the primary delivery address, wherein the approach signal triggers the providing of the alternative delivery address to the delivery person, when the addressee has entered a non-availability signal in a computer system associated with at least the first communication means.

13. The method according to claim 10, wherein a delivery route of the delivery person is amended during following said route, based on the change of the primary delivery address to an alternative delivery address.

14. The method according to claim 10, wherein said link is represented as a virtual door bell represented on a hand held device of a delivery person.

15. The method according to claim 10, wherein:
in a computer system and/or in the at least one first hand held device for at least a series of delivery addresses recognition codes are stored, said recognition codes being transmitted with the relevant proximity signal transmitted by the relevant beacon, wherein an indication is provided that no delivery is expected for an address and/or addressee related to said recognition code; and/or
a recognition code provided with a first signal is provided with an indication, or accompanied by a further signal comprising an indication, to the first hand held device, that no delivery is expected for an address and/or addressee associated with said recognition code,
wherein the first hand held device is designed for ignoring a recognition code and/or not presenting any information associated to said recognition code to the user of said first hand held device when said indication is provided for or with said recognition code that no delivery is expected for said address and/or addressee.

16. The method according to claim 10, wherein:
in a computer system and/or in the at least one first hand held device for a series of delivery addresses individual recognition codes are stored, said recognition codes being transmitted with the relevant proximity signal transmitted by the relevant beacon, wherein an indication is provided whether a delivery is expected for an address and/or addressee related to an individual recognition code,
wherein the first hand held device is designed for ignoring a recognition code and/or not presenting any information associated to said recognition code to the user of said first hand held device when said indication is provided for or with said recognition code that no delivery is expected for said address and/or addressee.

17. The method for delivery of at least one item to at least one delivery address of an addressee of the item,
wherein an intended delivery address for said item is entered into a first communication system available to a delivery person; and
wherein, during delivery of the item, proximity of a delivery person and/or delivery vehicle associated to said delivery person to the intended delivery address is detected;
wherein in the first communication system for at least a series of first signals an indication is provided whether a delivery is expected for an address and/or addressee related to said series of first signals; and/or
each first signal is provided with an indication, or accompanied by a further signal comprising an indication, to the first communication system, whether a delivery is expected for an address and/or addressee associated with said first signal, and/or in the first communication system a list of first signals is provided for which deliveries are to be made;

wherein the first communication system is designed for ignoring a first signal received and/or not presenting any information associated to said first signal to the user of said first communication system when no delivery is present for said address and/or addressee.

18. The method according to claim 17, wherein said proximity is detected wireless by means of at least one beacon at the delivery address, communicating wireless with the first communication system when part of the first communication system is brought within a wireless communication range of said at least one beacon and/or by activating a doorbell system of the delivery address.

* * * * *